(12) United States Patent
Seo et al.

(10) Patent No.: US 10,324,767 B2
(45) Date of Patent: Jun. 18, 2019

(54) ELECTRONIC DEVICE AND METHOD OF PROVIDING BATTERY INFORMATION BY ELECTRONIC DEVICE

(71) Applicant: Samsung Electronics Co., Ltd., Gyeonggi-do (KR)

(72) Inventors: Seok-Weon Seo, Gyeonggi-do (KR); Jong-Bum Choi, Gyeonggi-do (KR); Sang-Ho Kim, Gyeonggi-do (KR); Bo-Seok Moon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 203 days.

(21) Appl. No.: 14/297,225

(22) Filed: Jun. 5, 2014

(65) Prior Publication Data

US 2014/0365789 A1 Dec. 11, 2014

(30) Foreign Application Priority Data

Jun. 5, 2013 (KR) .................. 10-2013-0064521
Jan. 15, 2014 (KR) .................. 10-2014-0005031

(51) Int. Cl.
*G06F 9/50* (2006.01)
*G06F 3/0481* (2013.01)
(Continued)

(52) U.S. Cl.
CPC .............. *G06F 9/5094* (2013.01); *G06F 1/26* (2013.01); *G06F 1/266* (2013.01); *G06F 1/3203* (2013.01); *G06F 1/3206* (2013.01); *G06F 1/3212* (2013.01); *G06F 1/3287* (2013.01); *G06F 3/04817* (2013.01); *Y02B 60/1282* (2013.01); *Y02B 60/1292* (2013.01);
(Continued)

(58) Field of Classification Search
CPC ...... G06F 1/3203; G06F 1/26; Y02B 60/1217
See application file for complete search history.

(56) References Cited

U.S. PATENT DOCUMENTS 6,294,895 B1 9/2001 Kukai
6,668,179 B2 12/2003 Jiang
(Continued)

FOREIGN PATENT DOCUMENTS

CN 101065717 10/2007
CN 101233663 7/2008
(Continued)

OTHER PUBLICATIONS

U.S. Office Action dated Oct. 25, 2016 issued in counterpart U.S. Appl. No. 14/731,822, 11 pages.
(Continued)

*Primary Examiner* — Jaweed A Abbaszadeh
*Assistant Examiner* — Gayathri Sampath
(74) *Attorney, Agent, or Firm* — The Farrell Law Firm, P.C.

(57) ABSTRACT

An electronic device, a method of providing battery information of an electronic device, and a storage medium for storing the method are provided. The electronic device includes a storage unit that stores an application use history; and a controller that partitions an entire battery capacity into at least one or more logical batteries, and allocates at least one or more applications to each of the at least one or more logical batteries according to the application use history.

23 Claims, 21 Drawing Sheets

(51) Int. Cl.
  *G06F 1/3212*  (2019.01)
  *G06F 1/3287*  (2019.01)
  *G06F 1/26*    (2006.01)
  *G06F 1/3206*  (2019.01)
  *G06F 1/3203*  (2019.01)

(52) U.S. Cl.
  CPC ........... *Y02B 60/142* (2013.01); *Y02D 10/171* (2018.01); *Y02D 10/174* (2018.01); *Y02D 10/22* (2018.01)

(56) References Cited

U.S. PATENT DOCUMENTS

| | | | |
|---|---|---|---|
| 6,801,811 B2 | 10/2004 | Ranganathan et al. | |
| 7,057,372 B2 | 6/2006 | Chen et al. | |
| 7,825,631 B2 | 11/2010 | Chen et al. | |
| 7,873,852 B2 | 1/2011 | Bell | |
| 8,588,484 B2 | 11/2013 | Wang et al. | |
| 9,798,371 B2 | 10/2017 | Seo et al. | |
| 2005/0062612 A1* | 3/2005 | Smith | G06F 1/28 340/636.1 |
| 2005/0085277 A1 | 4/2005 | Chen et al. | |
| 2005/0125700 A1* | 6/2005 | Chang | G06F 9/4893 713/300 |
| 2005/0250531 A1 | 11/2005 | Takebe et al. | |
| 2006/0108979 A1 | 5/2006 | Daniel et al. | |
| 2006/0214638 A1* | 9/2006 | Chen | H02J 1/14 320/132 |
| 2006/0279256 A1* | 12/2006 | Bletsas | H02J 7/0047 320/128 |
| 2007/0004467 A1* | 1/2007 | Chary | G06F 1/3203 455/572 |
| 2007/0243852 A1* | 10/2007 | Gibbs | H04W 52/0264 455/343.5 |
| 2008/0141049 A1 | 6/2008 | Hassan et al. | |
| 2008/0186086 A1 | 8/2008 | Bell | |
| 2008/0307243 A1* | 12/2008 | Lee | G06F 1/3203 713/320 |
| 2010/0060238 A1 | 3/2010 | Chen et al. | |
| 2011/0040996 A1 | 2/2011 | Hackbom et al. | |
| 2011/0260691 A1* | 10/2011 | Ishibashi | B60L 11/1842 320/134 |
| 2011/0264899 A1* | 10/2011 | Evans | G01R 31/3682 713/1 |
| 2012/0047379 A1 | 2/2012 | Chen et al. | |
| 2012/0221868 A1 | 8/2012 | Pocklington et al. | |
| 2012/0221878 A1* | 8/2012 | Pocklington | G06F 1/3206 713/340 |
| 2012/0303171 A1* | 11/2012 | Barrett | H04W 52/0264 700/295 |
| 2013/0007662 A1 | 1/2013 | Bank et al. | |
| 2013/0196720 A1* | 8/2013 | Sivaraman | H04W 52/0261 455/573 |
| 2014/0068314 A1 | 3/2014 | Kim et al. | |
| 2014/0365789 A1 | 12/2014 | Seo et al. | |
| 2015/0179149 A1 | 6/2015 | Park | |

FOREIGN PATENT DOCUMENTS

| | | |
|---|---|---|
| EP | 2 493 161 | 8/2012 |
| KR | 1020010071113 | 7/2001 |
| KR | 1020050117088 | 12/2005 |
| KR | 10-0668758 | 1/2007 |
| KR | 1020090012788 | 2/2009 |
| KR | 1020120129257 | 11/2012 |

OTHER PUBLICATIONS

Nairan Zhang et al., "PowerVisor: A Battery Virtualization Scheme for Smartphones", Proceedings of the Third ACM Workshop on Mobile Cloud Computing and Services, MCS '12, Jun. 25, 2012, XP055310983, 8 Pages.
European Search Report dated Oct. 25, 2016 issued in counterpart application No. 14807077.4-1959, 10 pages.
Chinese Office Action dated Apr. 3, 2018 issued in counterpart application No. 201480032188.6, 19 pages.
Chinese Office Action dated Nov. 29, 2018 issued in counterpart application No. 201480032188.6, 19 pages.
U.S. Office Action dated Dec. 27, 2018 issued in counterpart U.S. Appl. No. 15/720,902, 20 pages.

* cited by examiner

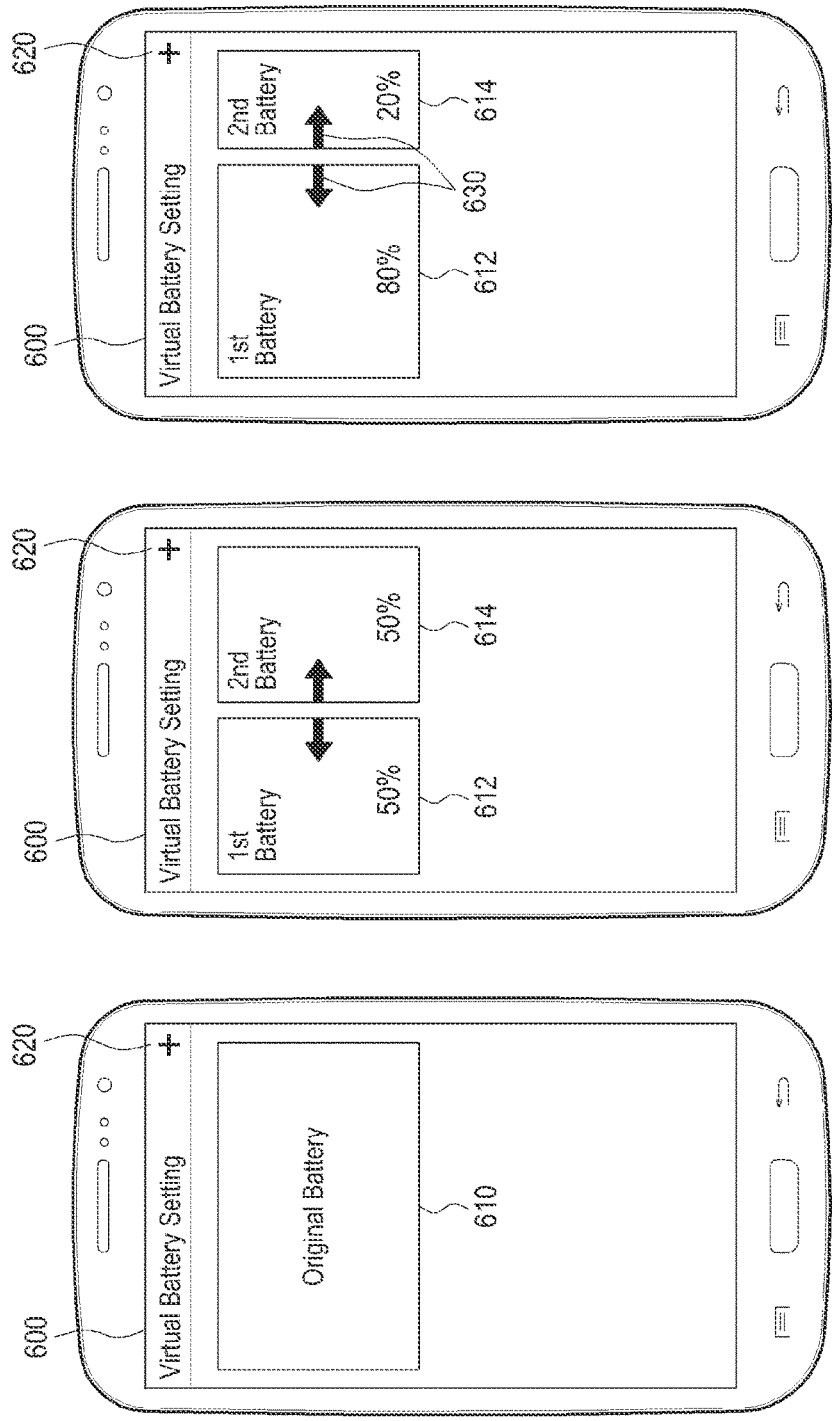

| FUNCTION OR APPLICATION | PERCENT (%) |
|---|---|
| K-talk | 30 |
| Facebook | 15 |
| Telephone | 10 |
| Game | 5 |
| ... | ... |

FIG.10

|  | MON | TUE | WED | ... | SUN |
|---|---|---|---|---|---|
| K-talk | 15HOURS (10)<br>17HOURS (20) | 11HOURS (5)<br>10HOURS (1) | 9HOURS (15)<br>13HOURS (10) | ... | 10HOURS (30)<br>12HOURS (30) |
| Facebook | 15HOURS (10)<br>17HOURS (20) | 11HOURS (5)<br>10HOURS (1) | 9HOURS (15)<br>13HOURS (10) | ... | 10HOURS (25)<br>12HOURS (25) |
| Telephone | ... | ... | ... | ... | ... |
| ⋮ | ⋮ | ⋮ | ⋮ | ⋮ | ⋮ |

FIG.11

ELECTRONIC DEVICE AND METHOD OF PROVIDING BATTERY INFORMATION BY ELECTRONIC DEVICE

PRIORITY

This application claims priority under 35 U.S.C. § 119(a) to Korean Patent Application Serial Nos. 10-2013-0064521 and 10-2014-0005031, which were filed in the Korean Intellectual Property Office on Jun. 5, 2013 and Jan. 15, 2014, respectively, the entire content of each of which are incorporated herein by reference.

BACKGROUND

1. Field of the Invention

The present disclosure generally relates to an electronic device and a method of providing battery information of an electronic device.

2. Description of the Related Art

In recent years, electronic devices using a battery, such as portable computers, mobile phones, smart phones, and the like, have increased in number with the development of electronic technologies. Battery information according to a charged or discharged state of the battery plays an important role in using the electronic devices. For example, in the electronic devices, battery residual capacity information representing how much battery capacity is left is necessary for storing currently processed data or protecting the electronic device before the battery thereof is discharged. Furthermore, the battery residual capacity information is necessary for predicting how long a user can continue to use the electronic devices. Accordingly, today's electronic devices employ various methods for providing the battery information to users.

Meanwhile, electronic devices such as portable computers, mobile phones, smart phones, and the like can provide numerous functions and can independently perform each of the functions. The functions may be provided in an application form. However, the electronic devices have only one battery supplying electrical power for the functions. Thus, if the battery is completely consumed when a user uses one function of the electronic device, the user cannot use other functions.

For example, in the case of an electronic device having a telephone function, a Global Positioning System (GPS) function, and a web-browser function, when a user wants to use the telephone function after the web-browser function, if a battery thereof is completely consumed, the user cannot use the telephone function. Accordingly, the user should be able to predict in advance the battery residual capacity for each of the functions. However, it is difficult to check the battery residual capacity that is needed for each of the functions through the entire battery residual capacity.

SUMMARY

The present disclosure has been made to address the above problems and disadvantages, and to provide at least advantages described below. Accordingly, an aspect of the present disclosure is to provide an electronic device and a method of providing battery information by an electronic device, in which a battery in the electronic device is partitioned into logical batteries according to functions so that a user can allocate a logical battery capacity according to the functions of the electronic device.

Another aspect of the present disclosure is to provide an electronic device and a method of providing battery information of an electronic device in which a battery in an electronic device is partitioned into logical batteries, and a function is automatically allocated to the logical batteries according to a user's use history, for example, according to functions used by the user and use time thereof, so that a battery capacity can be preferentially allocated to the frequently or essentially used functions or the preferred functions.

Another aspect of the present disclosure is to provide an electronic device and a method of providing battery information of an electronic device, in which a residual capacity for each of logical batteries is displayed according to power consumption used by each of functions allocated to the partitioned logical batteries, so that a user can identify the battery residual capacity according to the functions.

In accordance with an aspect of the present disclosure, an electronic device includes a storage unit that stores an application use history; and a controller that partitions an entire battery capacity into at least one or more logical batteries, and allocates at least one or more applications to each of the at least one or more logical batteries according to the application use history.

In accordance with another aspect of the present disclosure, a method of providing battery information of an electronic device is provided. The method includes storing an application use history; and allocating at least one or more applications to each of at least one or more logical batteries according to the application use history.

In accordance with another aspect of the present disclosure, a storage medium for storing a method of providing battery information of a mobile terminal is provided, wherein the method includes storing an application use history; allocating at least one or more applications to each of at least one or more logical batteries according to the application use history; and providing residual capacities for the at least one or more logical batteries according to power consumed by the at least one or more applications allocated to the at least one or more logical batteries.

In accordance with another aspect of the present disclosure, a portable terminal for providing battery information to a user is provided. The portable terminal includes at least one battery representing an entire battery capacity; a storage unit configured to store an application use history; a controller configured to partition the entire battery capacity into at least one or more logical batteries, and allocate at least one or more applications to each of the at least one or more logical batteries according to the application use history; and a display unit configured to display the entire battery capacity, and when the controller partitions the entire battery capacity into the at least one or more logical batteries, display a capacity of each of the one or more logical batteries to which an application has been allocated.

BRIEF DESCRIPTION OF THE DRAWINGS

The above and other aspects, features, and advantages of the present disclosure will be more apparent from the following detailed description, taken in conjunction with the accompanying drawings, in which:

FIGS. 6A-6C illustrate an example of a logical battery partition screen according to an embodiment of the present disclosure;

FIGS. 10 and 11 illustrate examples of an application use history according to an embodiment of the present disclosure;

DETAILED DESCRIPTION OF EMBODIMENTS OF THE PRESENT INVENTION

Figure 1:
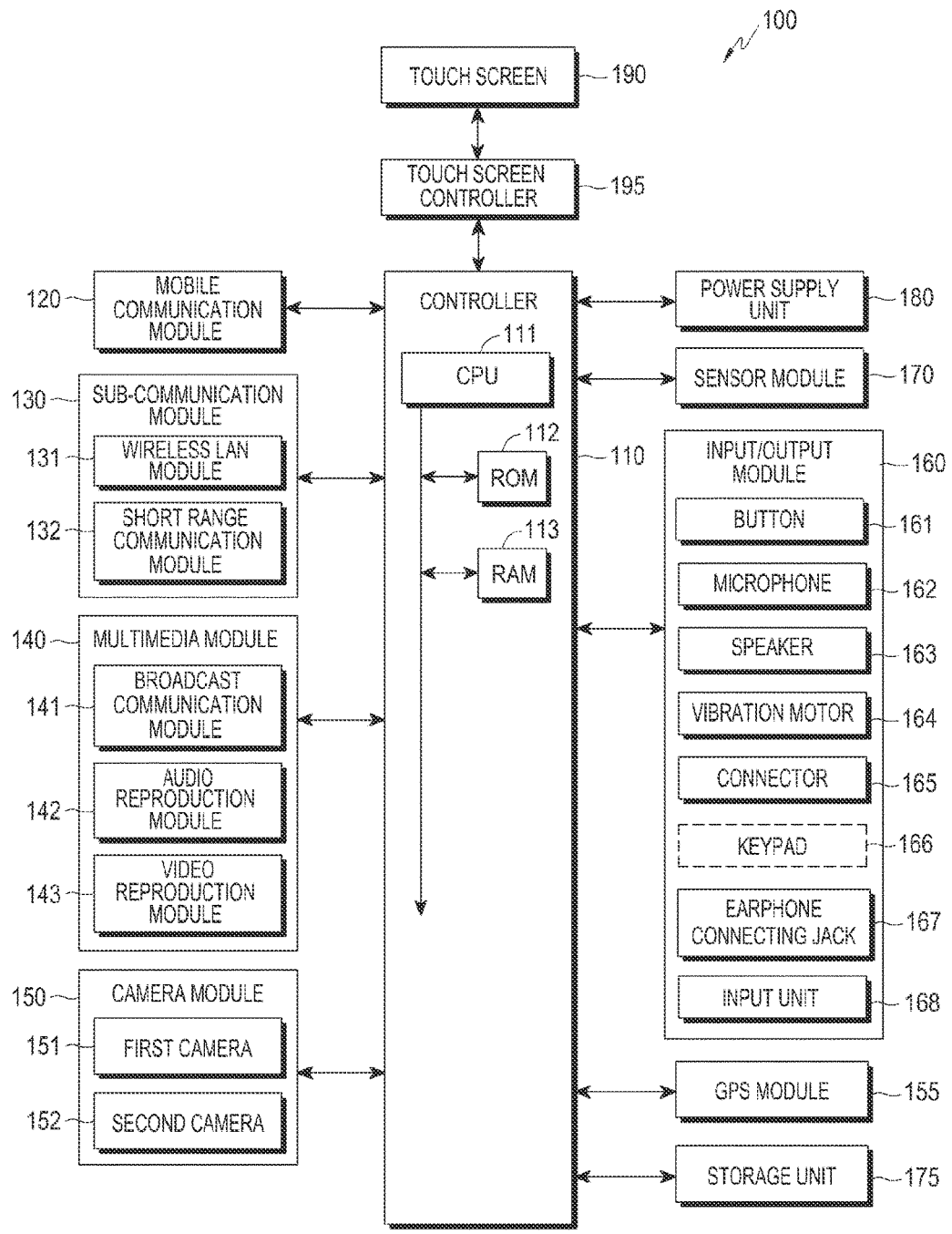
FIG. 1 is a block diagram illustrating a configuration of a mobile terminal according to an embodiment of the present disclosure.

Hereinafter, various embodiments of the present disclosure will be described with reference to the accompanying drawings. In the following description, the same elements will be designated by the same reference numerals if possible although they are shown in different drawings. Further, in the following description of the present disclosure, a detailed description of known functions and configurations incorporated herein will be omitted when it may make the subject matter of the present disclosure unclear.

As described above, according to the various embodiments of the present disclosure, a battery in an electronic device is partitioned into logical batteries according to functions or applications so that a user can allocate a logical battery capacity according to the functions or applications of the electronic device.

Furthermore, according to the various embodiments of the present disclosure, a battery in an electronic device is partitioned into logical batteries, and functions are automatically allocated to the logical batteries according to a user's use history, for example, according to functions used by the user and use time thereof, so that a battery capacity can be preferentially allocated to frequently or essentially used functions or the preferred functions.

Furthermore, according to the various embodiments of the present disclosure, a residual capacity for each of logical batteries is displayed according to power consumption used by each of the functions or applications allocated to the partitioned logical batteries so that a user can identify the battery residual capacity according to the functions or applications.

Moreover, according to the various embodiments of the present disclosure, one application or a category containing at least one or more applications is allocated to the partitioned logical batteries, so that the logical batteries can be used for one application or a plurality of applications corresponding to the same category.

In addition, according to the various embodiments of the present disclosure, among icons to be displayed on a home screen, icons of applications which are not allocated to the logical batteries are deactivated or are not displayed, so that usage of the applications which are not allocated to the logical batteries can be restricted.

Furthermore, according to the various embodiments of the present disclosure, when a logical battery is discharged, execution of an application corresponding to the discharged logical battery is interrupted, thereby restricting usage of the application such that the application can be used only for a time period corresponding to the capacity of the logical battery. For example, in a case in which a game application is allocated to one of logical batteries, if the logical battery is completely consumed, execution of the game application is interrupted, thereby restricting usage of the game application such that the game application can be used only for a time period corresponding to the predetermined capacity of the logical battery.

Embodiments of the present disclosure may be applied to any electronic device capable of performing functions or applications and receiving power from a battery. For example, an electronic device according to an embodiment of the present disclosure may be a user terminal such as a mobile phone, a smart phone, a tablet Personal Computer (PC), or the like. A mobile terminal will be described as an example of the electronic device in the embodiments of the present disclosure.

FIG. 1 is a block diagram illustrating a configuration of a mobile terminal according to an embodiment of the present disclosure. Referring to FIG. 1, the mobile terminal 100 may be connected with an external device by using a mobile communication module 120, a sub-communication module 130, and a connector 165. The "external device" includes a different device from the mobile terminal 100, a mobile phone, a smart phone (not illustrated), a tablet PC, and a server.

Referring to FIG. 1, the mobile terminal 100 includes a touch screen 190 and a touch screen controller 195. Also, the mobile terminal 100 includes a controller 110, the mobile communication module 120, the sub-communication module 130, a multimedia module 140, a camera module 150, a GPS module 155, an input/output module 160, a sensor module 170, a storage unit 175, and a power supply unit 180. The sub-communication module 130 includes at least one of a wireless Local Area Network (LAN) module 131 and a short range communication module 132, and the multimedia module 140 includes at least one of a broadcast communication module 141, an audio reproduction module 142, and a video reproduction module 143. The camera module 150 includes at least one of a first camera 151 and a second camera 152, and the input/output module 160 includes at least one of a button 161, a microphone 162, a speaker 163, a vibration motor 164, a connector 165, a keypad 166, an earphone jack 167, and an input unit 168.

The controller 110 includes a Central Processor Unit (CPU) 111, a Read Only Memory (ROM) 112 storing control programs for controlling the mobile terminal 100, and a Random Access Memory (RAM) 113 which stores signals or data input from the outside of the mobile terminal 100 or is used as a memory region for an operation executed in the mobile terminal 100. The CPU 111 may include a single core, a dual core, a triple core, or a quad core. The CPU 111, the ROM 112 and the RAM 113 may be connected with each other through internal buses.

The controller 110 controls the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195. Namely, the controller 110 performs an overall control function for the mobile terminal 100, and controls signal flows between the above-described configurations.

According to various embodiments of the present disclosure, the controller 110 partitions a battery into at least one or more logical batteries, sets a capacity of the at least one or more logical batteries, and allocates functions or applications to the at least one or more logical batteries. Furthermore, the controller 110 displays indicators for the at least one or more logical batteries to which the functions or applications are allocated. Moreover, the controller 110 determines a capacity of the logical batteries by using a use history of the functions or applications, and allocates at least one or more applications to the at least one or more logical batteries according to a use history of the applications. In addition, the controller 110 calculates residual capacities for the at least one or more logical batteries by using power consumption used by the functions or applications allocated to the at least one or more logical batteries, and displays the residual capacities for the at least one or more logical batteries. Furthermore, when any one of the logical batteries is discharged, the controller 110 interrupts execution of an application corresponding to the discharged logical battery. Moreover, the controller 110 may add or delete a logical battery, and may change capacities of the logical batteries. In addition, the controller 110 performs a control such that a category including at least one or more applications or one application is allocated to the logical batteries. According to the various embodiments of the present disclosure, the controller 110 may not display or may deactivate icons of applications which are not allocated to the logical batteries, among icons to be displayed on a home screen when the home screen is displayed, and may not display an icon of an application allocated to a discharged logical battery. Furthermore, when at least one or more logical batteries are discharged, the controller 110 displays an alert message and interrupts execution of applications corresponding to the discharged logical batteries. Moreover, when at least one or more logical batteries are discharged, the controller 110 displays a password input request message, and may change to a general battery operation mode or may reset the logical batteries when a password is input.

The mobile communication module 120 enables the mobile terminal 100 to be connected with an external device through mobile communication by using one antenna or a plurality of antennas under the control of the controller 110. The mobile communication module 120 transmits/receives a wireless signal for a voice call, a video call, a Short Message Service (SMS), or a Multimedia Message Service (MMS) to/from a mobile phone, a smart phone, a tablet PC, or another device, which has a phone number input into the mobile terminal 100.

The sub-communication module 130 includes at least one of the wireless LAN module 131 and the short-range communication module 132. For example, the sub-communication module 130 may include only the wireless LAN module 131, or only the short range communication module 132. Alternatively, the sub-communication module 130 may include both the wireless LAN module 131 and the short range communication module 132.

The wireless LAN module 131 may be connected to the Internet under the control of the controller 110 in a place where a wireless Access Point (AP) is installed. The wireless LAN module 131 supports a wireless LAN standard (IEEE802.11x) of the Institute of Electrical and Electronics Engineers (IEEE). The short range communication module 132 may wirelessly perform short range communication between the mobile terminal 100 and an image forming device under the control of the controller 110. The short range communication scheme may include Bluetooth and Infrared Data Association (IrDA) communication The mobile terminal 100 may include at least one of the mobile communication module 120, the wireless LAN module 131, and the short range communication module 132 according to a capability thereof. For example, the mobile terminal 100 may include a combination of the mobile communication module 120, the wireless LAN module 131, and the short range communication module 132 according to the capability thereof.

The multimedia module 140 includes the broadcast communication module 141, the audio reproduction module 142 and the video reproduction module 143. The broadcast communication module 141 receives a broadcast signal (e.g., a TV broadcast signal, a radio broadcast signal or a data broadcast signal) or broadcast additional information (e.g., Electric Program Guide (EPG) or Electric Service Guide (ESG)) which is transmitted from a broadcast station through a broadcast communication antenna under the control of the controller 110. The audio reproduction module 142 reproduces a stored or received digital audio file (e.g., a file having a file extension of mp3, wma, ogg, or wav) under the control of the controller 110. The video reproduction module 143 reproduces a stored or received digital video file (e.g., a file having a file extension of mpeg, mpg, mp4, avi, mov, or mkv) under the control of the controller 110. The video reproduction module 143 may reproduce a digital audio file. The multimedia module 140 may include the audio reproduction module 142 and the video reproduction module 143 without the broadcast communication module 141. Also, the audio reproduction module 142 or the video reproduction module 143 of the multimedia module 140 may be included in the controller 110.

The camera module 150 includes at least one of the first camera 151 and the second camera 152, each of which photographs a still image or a moving image under the control of the controller 110. In addition, the first camera 151 or the second camera 152 may include an auxiliary light source (e.g. a flash) that provides an amount of light required for photography. The first camera 151 may be disposed on a front surface of the mobile terminal 100, and the second camera 152 may be disposed on a rear surface of the mobile terminal 100. It is possible for the first camera 151 and the second camera 152 to be disposed to be adjacent to each other (e.g., an interval between the first camera 151 and the second camera 152 is larger than 1 cm and smaller than 8 cm) to photograph a three-dimensional still image or a three-dimensional moving image.

The GPS module 155 receives radio waves from a plurality of GPS satellites in Earth's orbit and calculates a position of the mobile terminal 100 by using Time of Arrival information from the GPS satellites to the mobile terminal 100.

The input/output module 160 includes at least one of a plurality of buttons 161, the microphone 162, the speaker 163, the vibration motor 164, the connector 165, the keypad 166, the earphone connecting jack 167, and the input unit 168.

The buttons 161 may be formed on the front surface, side surfaces or rear surface of the housing of the mobile terminal 100, and may include at least one of a power button, a lock button, a volume button, a menu button, a home button, a back button, and a search button 161.

The microphone 162 receives a voice or a sound to generate an electrical signal under the control of the controller 110.

The speaker 163 outputs sounds corresponding to various signals of the mobile communication module 120, the sub-communication module 130, the multimedia module 140, and the camera module 150 (e.g., a radio signal, a broadcast signal, a digital audio file, a digital video file, or photographing) to the outside of the mobile terminal 100 under the control of the controller 110. The speaker 163 may output a sound (for example, a button tone corresponding to phone communication or a ring tone) corresponding to a function performed by the mobile terminal 100. One or more speakers 163 may be formed at a proper position or positions of the housing of the mobile terminal 100.

The vibration motor 164 converts an electrical signal to mechanical vibration under the control of the controller 110. For example, when the mobile terminal 100 in a vibration mode receives a voice call from any other device, the vibration motor 164 operates. One or more vibration motors 164 may be provided in the housing of the mobile terminal 100. The vibration motor 164 may operate in response to a touch operation of a user who touches the touch screen 190, and a continuous movement of a touch on the touch screen 190.

The connector 165 may be used as an interface interconnecting the mobile terminal 100 and an external device or a power source. The mobile terminal 100 may transmit data stored in the storage unit 175 of the mobile terminal 100 to the external device or may receive data from the external device through a wired cable connected to the connector 165 under the control of the controller 110. The mobile terminal 100 may receive power from a power source through the wired cable connected to the connector 165 or may charge a battery.

The keypad 166 receives a key input from a user for control of the mobile terminal 100. The keypad 166 includes a physical keypad formed in the mobile terminal 100 or a virtual keypad displayed on the touch screen 190. The physical keypad formed on the mobile terminal 100 may be omitted according to the capability or configuration of the mobile terminal 100.

Earphones are inserted into the earphone connecting jack 167 to be connected to the mobile terminal 100. The input unit 168 may be a stylus pen. The input unit 168 may be inserted and maintained within the mobile terminal 100, and may be withdrawn or separated from the mobile terminal 100 for use thereof.

The sensor module 170 includes at least one sensor for detecting a state of the mobile terminal 100. For example, the sensor module 170 may include a proximity sensor that detects whether the user approaches the mobile terminal 100, an illumination sensor that detects an amount of light around the mobile terminal 100, or a motion sensor that detects a motion of the mobile terminal 100 (e.g., rotation of the mobile terminal 100, or acceleration or vibration applied to the mobile terminal 100). At least one sensor may detect the state, and may generate a signal corresponding to the detection to transmit the generated signal to the controller 110. The sensor of the sensor module 170 may be added or omitted according to a capability of the mobile terminal 100.

The storage unit 175 stores signals or data input/output to correspond to an operation of the mobile communication module 120, the sub-communication module 130, the multimedia module 140, the camera module 150, the GPS module 155, the input/output module 160, the sensor module 170, and the touch screen 190 under the control of the controller 110. The storage unit 175 stores applications and a control program for control of the mobile terminal 100 or the controller 110

In particular, the storage unit 175 may include information on a user interface provided by the mobile terminal 100 according to an embodiment of the present disclosure. Such information on the user interface includes at least one input type, and an input according to the at least one input type.

The term "storage unit" is used as a term which refers to a random data storage device such as the storage unit 175, the ROM 112 and the RAM 113 within the controller 110, or a memory card mounted on the mobile terminal 100 (e.g., a Secure Digital (SD) card or a memory stick). The storage unit may include a non-volatile memory, a volatile memory, a Hard Disc Drive (HDD) or a Solid State Drive (SSD).

The power supplier 180 supplies power to one battery or a plurality of batteries provided to the mobile terminal 100 under the control of the controller 110. The one battery or the plurality of batteries supply power to the mobile terminal 100. In addition, the power supply unit 180 may supply, to the mobile terminal 100, the power input from an external power source through a wired cable connected with the connector 165.

The touch screen 190 provides a user with a User Interface (UI) corresponding to various services (e.g., a voice call, a data transmission, broadcast, and photographing). The touch screen 190 transmits an analog signal corresponding to at least one touch input to the user interface to the touch screen controller 195. The touch screen 190 receives at least one touch input by a user's body (e.g., fingers) or a touchable input means (e.g., a stylus pen). Also, the touch screen 190 may receive a continuous movement of one touch among at least one touch. The touch screen 190 transmits an analog signal corresponding to the continuous movement of the touch input thereto to the touch screen controller 195.

In particular, according to an embodiment of the present disclosure, the touch screen 190 may display at least one logical battery indicator under the control of the controller 110.

In the various embodiments of the present disclosure, the touch is not limited to contact between the touch screen 190 and the user's body or the touchable input means, and may include a contactless touch (e.g., the detectable interval between the touch screen 190 and the user's body or the touchable input means is not more than 1 mm). The interval detectable from the touch screen 190 may vary depending on the capability or configuration of the mobile terminal 100. The touch screen 190 may be implemented, for example, in a resistive type, a capacitive type, an Electro Magnetic Resonance (EMR) type, an infrared type, or an acoustic wave type of touch screen, and may also be implemented in at least one combination thereof.

The touch screen controller 195 converts the analog signal received from the touch screen 190 to a digital signal (e.g., X and Y coordinates) and transmits the digital signal to the controller 110. The controller 110 controls the touch screen 190 by using the digital signal received from the touch screen controller 195. For example, the controller 110 may cause a shortcut icon displayed on the touch screen 190 to be selected or may execute the shortcut icon in response to a touch. Further, the touch screen controller 195 may be included in the controller 110.

In addition, the controller 110 may detect various user inputs received through the camera module 150, the input/output module 160, and the sensor module 170, in addition to the input unit 190. The user input may include various types of information input to the mobile terminal 100, such as a gesture, a voice, a pupil action, and a bio signal of the user as well as the touch. The controller 110 controls the mobile terminal 100 to perform a predetermined operation or function corresponding to the detected user input.

Figure 2:
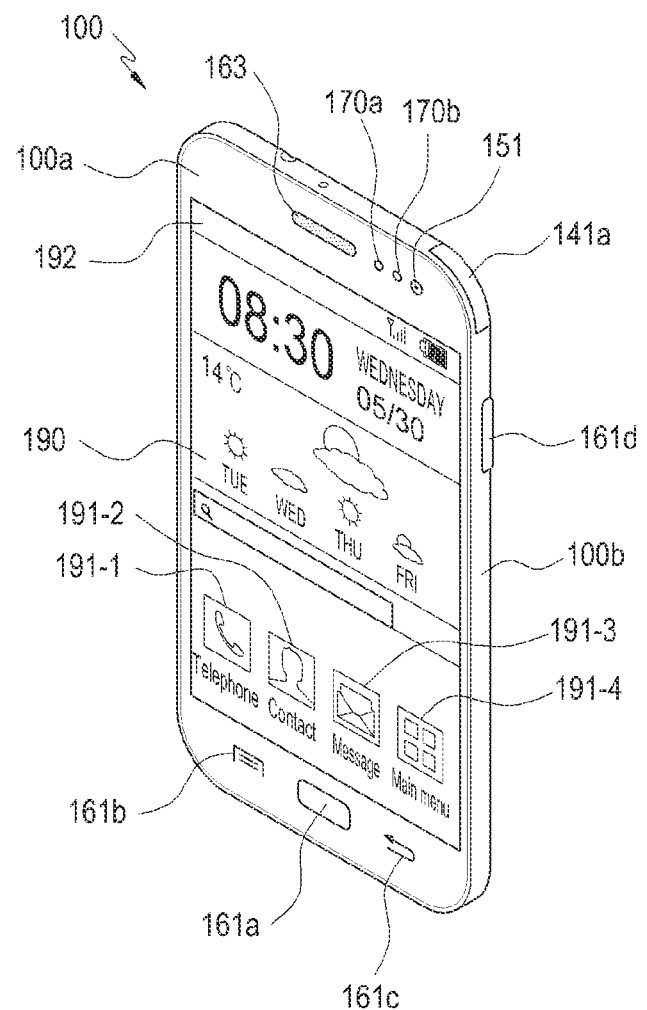
FIG. 2 is a front perspective view of the mobile terminal according to the embodiment of the present disclosure.
Figure 3:
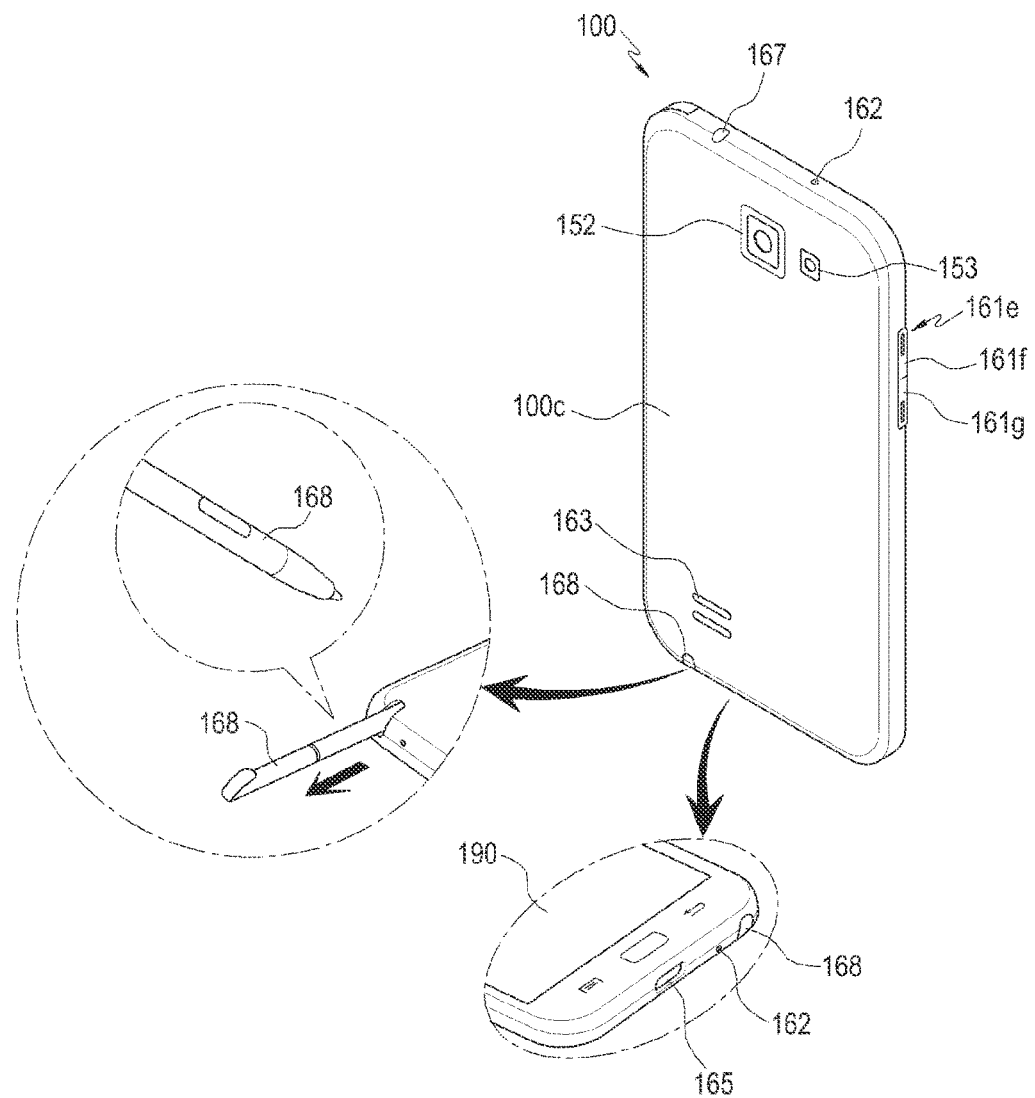
FIG. 3 is a rear perspective view of the mobile terminal according to the embodiment of the present disclosure.

FIG. 2 is a front perspective view of the mobile terminal according to the embodiment of the present disclosure, and FIG. 3 is a rear perspective view of the mobile terminal according to the embodiment of the present disclosure.

Referring to FIGS. 2 and 3, the touch screen 190 is disposed in the center of the front surface 100a of the mobile terminal 100. The touch screen 190 may have a large size to occupy most of the front surface 100a of the mobile terminal 100. FIG. 2 illustrates an example where a main home screen is displayed on the touch screen 190. The main home screen is a first screen displayed on the touch screen 190 when power of the mobile terminal 100 is turned on. Further, when the mobile terminal 100 has several pages of different home screens, the main home screen may be a first home screen of the several home screens. Short-cut icons 191-1, 191-2, and 191-3 for executing frequently used applications, a main menu switching icon 191-4, time, weather and the like may be displayed on the home screen. A menu screen is displayed on the touch screen 190 through the main menu switching icon 191-4. At an upper end portion of the touch screen 190, a status bar 192 may be formed that indicates the status of the mobile terminal 100, such as the battery charge status, the intensity of a received signal and the current time.

The touch screen 190 has a home button 161a, a menu button 161b and a back button 161c which are arranged at a lower portion thereof.

The home button 161a causes the main home screen to be displayed on the touch screen 190. For example, when the home key 161a is touched in a state where a different home screen or the menu screen is displayed on the touch screen 190, the main home screen may be displayed on the touch screen 190. Further, when the home button 161a is touched while applications are executed on the touch screen 190, the main home screen shown in FIG. 2 may be displayed on the touch screen 190. In addition, the home button 161a may be used to display recently used applications or a task manager on the touch screen 190.

The menu button 161b provides a connection menu which may be displayed on the touch screen 190. The connection menu includes a widget addition menu, a background changing menu, a search menu, an editing menu, an environment setup menu and the like. The back button 161c may be used for displaying the screen which was executed just before the currently executed screen or terminating the most recently used application.

The first camera 151, the illumination sensor 170a, and the proximity sensor 170b may be disposed on edges of the front side 100a of the mobile terminal 100. The second camera 152, the flash 153, and the speaker 163 may be disposed on a rear surface 100c of the mobile terminal 100.

The power button 161d, the volume button 161e, a terrestrial DMB antenna 141a for broadcast reception, and one or a plurality of microphones 162 may be disposed on a side surface 100b of the mobile terminal 100. The DMB antenna 141a may be secured to the mobile terminal 100 or may be formed to be detachable from the mobile terminal 100.

Further, the mobile terminal 100 has the connector 165 arranged on a side surface of a lower end thereof. A plurality of electrodes are formed in the connector 165, and the connector 165 may be connected to an external device by a wired cable. The earphone connecting jack 167 may be formed on a side surface of an upper end of the mobile terminal 100. An earphone may be inserted into the earphone connecting jack 167.

The input unit 168 may be located on a side surface of the mobile terminal 100. The input unit 168 may be inserted into the mobile terminal 100 to be stored in the mobile terminal 100, and withdrawn and separated from the mobile terminal 100 when it is used. The input unit 168 may be a stylus pen.

In particular, according to an embodiment of the present disclosure, the above-configured controller 110 of the mobile terminal 100 may partition the battery into at least one logical battery, and may perform a control operation required for allocating a function or an application to the logical battery according to a user input, a function of the mobile terminal 100, or a use history of the application. Furthermore, the controller 110 may perform a control operation for displaying a residual capacity for the logical battery according to a power amount consumed by the function or the application allocated to the logical battery. Moreover, the controller 110 may perform a control operation for adjusting the partitioning and the allocation of the logical battery according to a user's use history of the mobile terminal 100 or a user's demands.

Such a controller 110 includes a logical battery managing unit 400, and performs the control operations through the logical battery managing unit 400.

Figure 4:
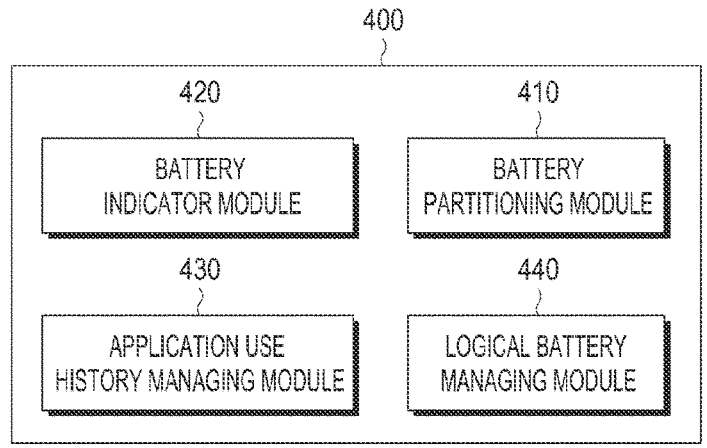
FIG. 4 is a block diagram of a configuration of a logical battery managing unit according to an embodiment of the present disclosure.

FIG. 4 illustrates a block diagram of configurations of a logical battery managing unit 400 according to an embodiment of the present disclosure. Referring to FIG. 4, the logical battery managing unit 400 includes a battery partitioning module 410, a battery indicator module 420, an application use history managing module 430, and a logical battery managing module 440.

The battery partitioning module 410 partitions a battery into at least one or more logical batteries. For example, the battery may be one or more physical batteries, and the battery partitioning module 410 partitions an entire battery capacity of the one or more physical batteries into at least one or more battery capacities, and creates virtual logical batteries with the partitioned battery capacities. At this time, the at least one or more logical batteries may include a logical battery for emergency that will be used in emergency situations or minimum logical batteries for a system that are required for a system operation of the mobile terminal 100. The logical battery for emergency use or the logical batteries for the system may be displayed such that a user cannot have access thereto. According to another embodiment, the logical battery for emergency use or the logical batteries for the system may not be included in the target for the logical battery partition and may correspond to values determined as default values within the mobile terminal 100.

Furthermore, the battery partitioning module 410 allocates functions or applications to the logical batteries, respectively, according to the user's use history of the mobile terminal 100 or the users' demands. The battery partitioning module 410 adjusts the partition of the logical batteries and the allocation of the functions or applications according to the user's use history of the mobile terminal 100 or the users' demands. For example, the battery partitioning module 410 may partition the logical batteries according to categories and may allocate the categories to the partitioned logical batteries, respectively. Also, the battery partitioning module 410 may partition the logical batteries according to applications and may allocate the applications to the partitioned logical batteries, respectively.

The battery indicator module 420 may create indicators representing the at least one or more logical batteries, respectively, and allows the functions or applications allocated to the respective logical batteries and the indicators representing a residual battery capacity of the logical batteries to be displayed on the touch screen 190.

The application use history managing module 430 stores a user's function or application use history in the storage unit 175, and manages a use history including a name of an application, a time point and an amount of time when the application has been used, and a frequency at which the application has been used. For example, the application use history managing module 430 determines which function or application is used for the longest amount of time, based on an amount of time spent using functions or applications by a user within a predetermined period of time. Furthermore, the application use history managing module 430 determines which function or application is most frequently used by a user, which function or application is used, and when the function or application is mainly used.

The logical battery managing module 440 calculates and provides a residual capacity for the logical batteries according to an amount of power consumed by the functions or applications allocated to the logical batteries. The residual capacity for the logical batteries may be displayed on the touch screen 190. For example, the logical battery managing module 440 calculates and provides a residual capacity for the logical batteries according to an amount of power consumed by the applications allocated to the respective logical batteries. In another example, the logical battery managing module 440 calculates and provides a residual capacity for the logical batteries according to power consumption for each of the categories, that is, an amount of power consumed by at least one or more applications in the corresponding category. At this time, the logical battery managing module 440 may be separately provided with an application list managing module (not illustrated) for each category, and may manage an application list for each category.

Hereinafter, operations will be specifically described in which the mobile terminal 100 provided with the logical battery managing unit 400 partitions a battery into logical batteries and allocates functions or applications to the logical batteries, respectively.

Figure 5:
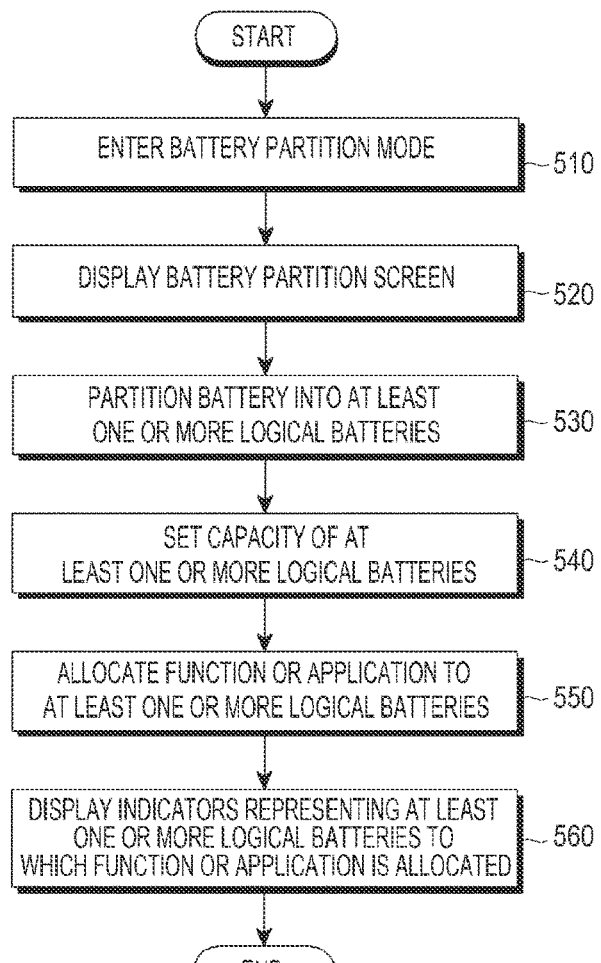
FIG. 5 is a flowchart illustrating operations of partitioning a battery into logical batteries and allocating functions or applications to the logical batteries according to an embodiment of the present disclosure.

FIG. 5 is a flowchart illustrating operations of partitioning a battery into logical batteries and allocating functions or applications to the logical batteries according to an embodiment of the present disclosure.

Referring to FIG. 5, a mobile terminal 100 enters a battery partition mode, in step 510. The mobile terminal 100 may enter the battery partition mode according to a request for partitioning a battery by a user's input such as a touch input, or may automatically enter the battery partition mode under a predetermined condition.

In step 520, the mobile terminal 100 displays a battery partition screen through a display unit such as a touch screen 190 after entering the battery partition mode. In step 530, the mobile terminal 100 partitions a battery into at least one or more logical batteries by using the battery partition screen. In step 540, the mobile terminal 100 sets a capacity of the at least one or more logical batteries.

For example, the mobile terminal 100 may represent an entire capacity of one or more physical batteries as one battery, and may create and represent at least one or more virtual logical batteries having capacities into which the entire battery capacity of the one or more physical batteries is partitioned. At this time, at least one or more logical batteries may include a logical battery for emergency that will be used in emergency situations or minimum logical batteries for a system required for a system operation of the mobile terminal 100. The logical battery for emergency use or the logical batteries for the system may be displayed such that a user cannot access these batteries. According to another embodiment, the logical battery for emergency use or the logical batteries for the system may not be included in the logical battery partition target, and may be values determined as default values within the mobile terminal 100.

Referring to FIG. 6 which illustrates an example of a logical battery partition screen according to an embodiment of the present disclosure, the mobile terminal 100 displays an original battery 610 on a battery partition screen 600 as illustrated in FIG. 6A, in which the original battery 610 represents an entire capacity of one or more physical batteries as one battery. A user may input a request for partitioning the battery by selecting a battery partition icon or button 620 while the original battery 610 is displayed. When the request for partitioning the battery is input, the mobile terminal 100 partitions the original battery 610 into a first logical battery 612 and a second logical battery 614 as illustrated in FIG. 6B. At this time, N logical batteries, including a third logical battery (not illustrated), a fourth logical battery (not illustrated), and the like may be additionally created according to the user's selection.

The mobile terminal 100 sets battery capacities of the first logical battery 612 and the second logical battery 614 by the user's selection or input as illustrated in FIG. 6C. The battery capacities may be identically partitioned in an initial stage and thereafter may be adjusted by the user's selection. For example, the user may set the battery capacities by moving a capacity adjustor 630 between the first logical battery 612 and the second logical battery 614 to allocate a greater capacity to either one of the first logical battery 612 or the second logical battery 614.

Referring back to FIG. 5, the mobile terminal 100 allocates functions or applications to the at least one or more logical batteries, respectively, in step 550. At this time, not only one function or application but also a function or application folder in which one or more functions or applications are grouped together may be allocated to the respective logical batteries.

Referring now to FIG. 7 which illustrates an example of a screen for allocation of functions or applications to logical batteries according to an embodiment of the present disclosure, the mobile terminal 100 displays, on the battery partition screen 600, a screen 700 for allocation of functions or applications to the at least one or more partitioned logical batteries, for example, the first logical battery 612 and the second logical battery 614.

Figure 7A:
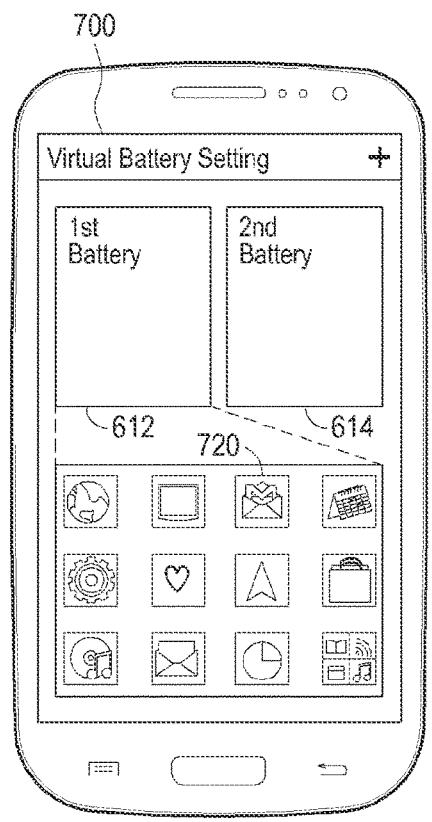
FIGS. 7A-7B illustrate an example of a screen for allocation of functions or applications to logical batteries according to an embodiment of the present disclosure.
Figure 7B:
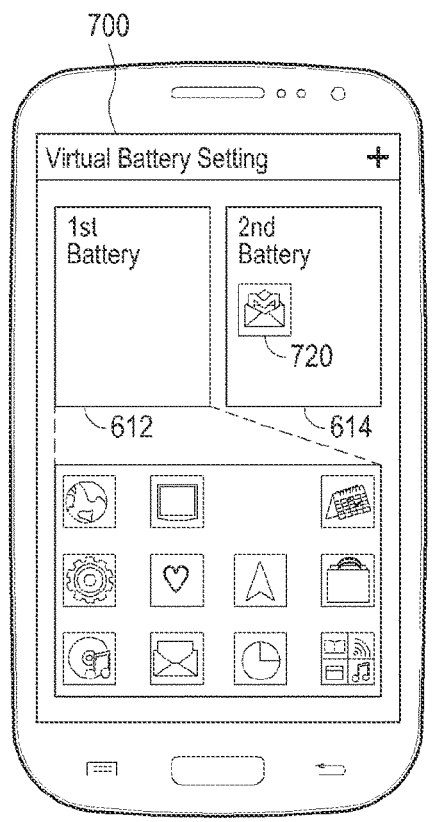

Referring to FIG. 7A, one of various functions or applications, such as e-mail, gallery, Gmail, Google, movie, studio, navigation, and the like, provided by the mobile terminal 100 may be allocated to the first logical battery 612 and the second logical battery 614. For example, when the Gmail application 720 among the various functions or applications is moved to the second logical battery 614 by a touch and drag motion of the user, the Gmail application 720 is allocated to the second logical battery 614 and the remaining functions or applications remain allocated to the first logical battery 612 as illustrated in FIG. 7B.

Meanwhile, at least one function or application other than the Gmail application 720 may also be allocated to the first logical battery 612 or the second logical battery 614.

Referring back to FIG. 5, when the functions or applications are allocated to the at least one or more logical batteries as described above, the mobile terminal 100 displays indicators representing the at least one or more logical batteries to which the functions or applications are allocated, in step 560.

FIG. 8 illustrates an example of a screen for displaying logical battery indicators according to an embodiment of the present disclosure. Referring to FIG. 8, the logical battery indicators may be displayed on a home screen or a status bar 192.

Figures 8A, 8B:
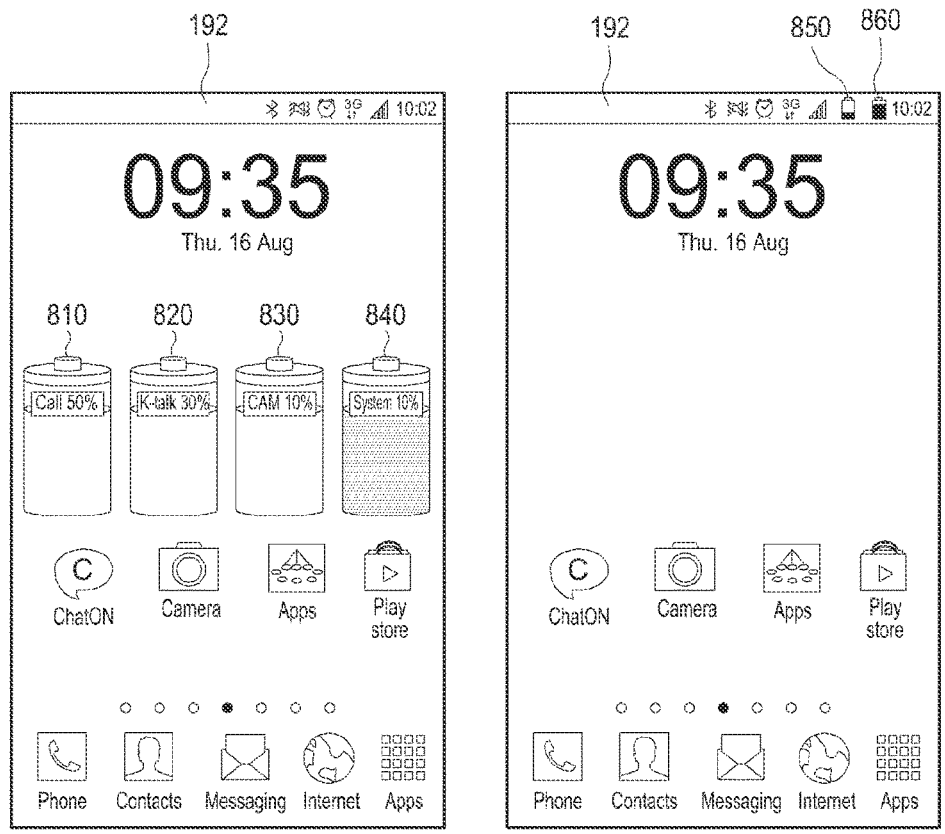
FIGS. 8A-8B illustrate an example of a screen for displaying logical battery indicators according to an embodiment of the present disclosure.

FIG. 8A illustrates the logical battery indicators displayed on the home screen. In FIG. 8A, the logical battery indicators 810 to 840 represent that an original battery (100%) is partitioned into four logical batteries having capacities of 50%, 30%, 10%, and 10%, respectively, and a call function (call), a K-talk application (K-talk), a camera function (CAM), and a system function (System) are allocated to the respective four logical batteries. At this time, since the logical battery to which the system function is allocated is created not by a user but by the mobile terminal 100, it may be impossible for the user to access the logical battery. FIG. 8B illustrates the logical battery indicators displayed on the status bar. FIG. 8B represents that two logical battery indicators 850 and 860 may be displayed on the status bar.

Meanwhile, in the above-described embodiment of the present disclosure, the battery is partitioned into the logical batteries and the functions or applications are allocated to the logical batteries according to the user's input. According to another embodiment of the present disclosure, a battery may be automatically partitioned into logical batteries and functions or applications may be allocated to the logical batteries, by using a function or application use history of the mobile terminal 100.

Figure 9:
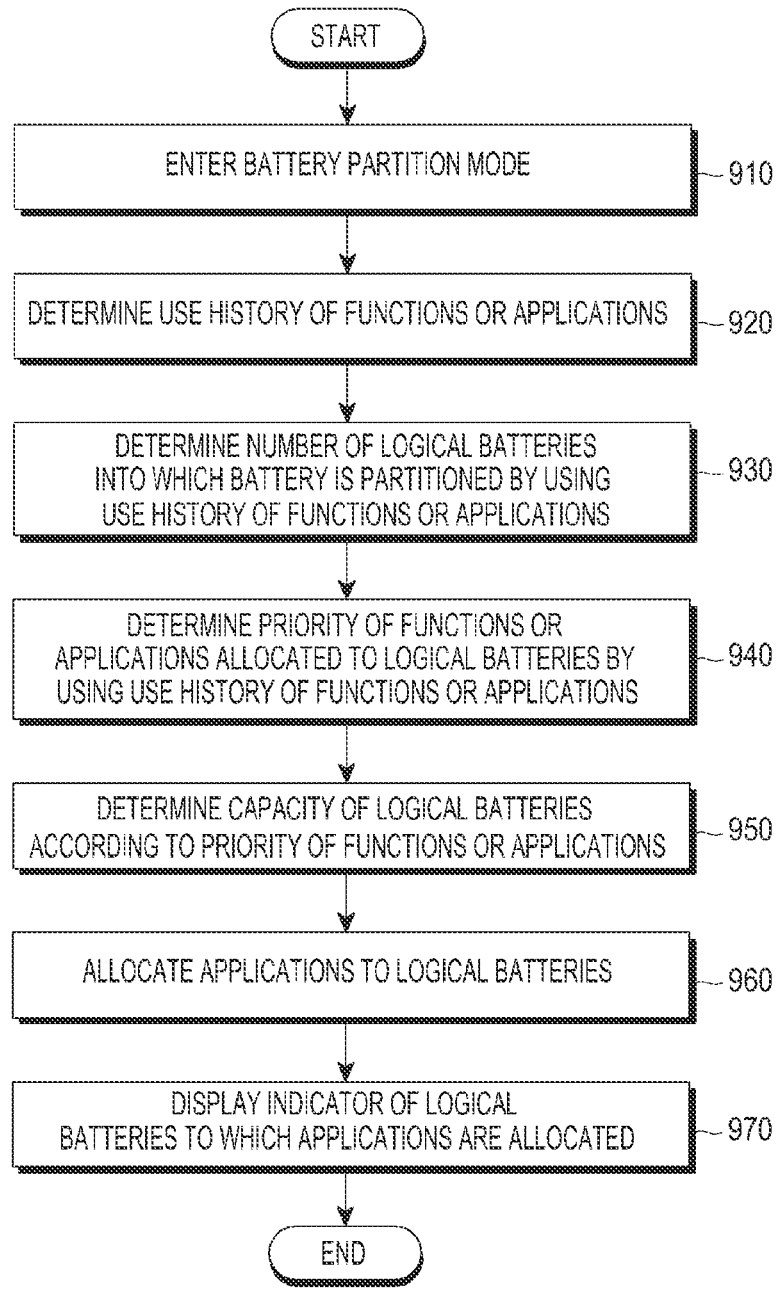
FIG. 9 is a flowchart illustrating operations of partitioning a battery into logical batteries and allocating applications to the logical batteries by using a use history of functions or applications according to an embodiment of the present disclosure.

FIG. 9 is a flowchart illustrating operations of partitioning a battery into logical batteries and allocating applications to the logical batteries by using a use history of functions or applications according to an embodiment of the present disclosure.

Referring to FIG. 9, a mobile terminal 100 enters a battery partition mode, in step 910. The mobile terminal 100 may enter the battery partition mode according to a request for partitioning a battery by a user's input such as a touch input, or may automatically enter the battery partition mode under a predetermined condition using the use history of the functions or applications.

In step 920, the mobile terminal 100 determines the use history of the functions or applications after entering the battery partition mode.

The mobile terminal 100 stores the use history of the functions or applications in a storage unit 175. For example, the mobile terminal 100 may store the use time or the use frequency of the functions or applications. More specifically, the mobile terminal 100 may store the use frequency of the functions or applications at every hour, everyday from Monday to Sunday. The use frequency may be increased by unity whenever the functions or applications are used.

The mobile terminal 100 may determine a time point and an amount of time when an application has been used and a frequency at which an application has been used, by using the use history of the functions or applications stored as described above. Furthermore, the mobile terminal 100 may determine which function or application is used the longest over a predetermined period of time. Moreover, the mobile terminal 100 may determine which function or application is most frequently used by a user. In addition, the mobile terminal 100 may determine which function or application is used and when the function or application is mainly used.

Referring now to FIGS. 10 and 11, which illustrate examples of an application use history according to an embodiment of the present disclosure, and in particular to FIG. 10, the mobile terminal 100 determines a ratio of use time for each function or application to use time for all functions or applications in percentages. For example, FIG. 10 illustrates a case in which it is determined that the K-talk application has a use time of 30%, the Facebook™ application has a use time of 15%, a telephone function has a use time of 10%, and a game application has a use time of 5%, as compared with the use time for all the functions or applications.

In FIG. 11, the mobile terminal 100 determines when and how often all functions or applications have been used. For example, FIG. 11 illustrates a name of applications, and what time and how often the applications have been used for a week from Monday to Sunday. For example, FIG. 11 illustrates a case in which it is determined that the K-talk application was used ten times at about 3:00 p.m. (e.g., between 2:00 p.m. and 3:00 p.m.) and twenty times at 5:00 p.m. on Monday, and the Facebook™ application was used ten times at about 3:00 p.m. and twenty times at 5:00 p.m. on Monday.

Referring back to FIG. 9, in step 930, the mobile terminal 100 determines the number of logical batteries into which a battery is to be partitioned, by using the use history of the functions or application. For example, the number of logical batteries and capacities of the logical batteries may be determined depending on the number of functions or applications used for a predetermined period of time or more and use time thereof. As an example, referring to FIG. 10, since four applications including the K-talk application, the Facebook™ application, the telephone application, and the game application were used for a time period corresponding to at least 5% or more of the use time of all the functions or applications, it may be determined that the number of logical batteries into which the battery is to be partitioned corresponds to 4.

Furthermore, the number of logical batteries may be determined depending on the number of functions or applications used a predetermined number of times or more. For example, the number of logical batteries may be determined depending on the number of functions or applications used at least one hundred times from Monday to Sunday. The number of logical batteries may also be determined by a number predetermined in advance by a user.

In step 940, the mobile terminal 100 determines a priority of the functions or applications which will be allocated to the logical batteries, by using the use history of the functions or applications.

For example, the mobile terminal 100 may determine the functions or applications used for the longest amount of time within the entire use time as functions or applications having the highest priority, and the functions or applications used for the shortest amount of time as functions or application having the lowest priority. As an example, in the case of FIG. 10 in which the K-talk application has been used for the longest amount of time at 30%, the Facebook™ application has been used for the second longest amount of time at 15%, the telephone function has been used for the third longest amount of time at 10%, and the game application has been used for the shortest amount of time at 5%, as illustrated in FIG. 10, the mobile terminal 100 may determine the K-talk application as an application having the highest priority and the game application as an application having the lowest priority.

Furthermore, the mobile terminal 100 may determine the most frequently used functions or applications among all the functions or applications as functions or applications having the highest priority, and the least frequently used functions or applications as functions or application having the lowest priority. At this time, the mobile terminal 100 may also determine the priority of the functions or applications based on the use time and the use frequency from Monday to Sunday, namely, for a week, and more specifically, may also determine the priority of the functions or applications based on the use time and the use frequency at every hour on each day of the week.

In step 950, the mobile terminal 100 determines a capacity of the logical batteries according to the priority of the functions or applications. For example, the mobile terminal 100 determines the capacity of the logical batteries as having a larger capacity value for the functions or applications having a higher priority, and as having a smaller capacity value for the functions or applications having a lower priority. Meanwhile, the capacity of the logical batteries may be determined in advance by a user or may also be determined in advance as a default value.

In step 960, the mobile terminal 100 allocates the corresponding applications to the at least one or more logical batteries, respectively. For example, in a case in which the K-talk application has the highest priority, the Facebook™ application has the second highest priority, the telephone function has the third highest priority, and the game application has the lowest priority, the mobile terminal 100 may allocate the K-talk application having the highest priority to the logical battery having the largest capacity and the game application having the lowest priority to the logical battery having the smallest capacity.

When the functions or applications are allocated to the at least one or more logical batteries according to the use history thereof as described above, the mobile terminal 100 displays indicators representing the at least one or more logical batteries to which the functions or applications are allocated, in step 970. A method of displaying the indicators representing the at least one or more logical batteries may be identical to that illustrated in FIG. 8.

According to the embodiment of the present disclosure, the mobile terminal 100 may display a residual capacity of the at least one or more logical batteries according to power consumed by the functions or applications allocated to the at least one or more logical batteries.

Figure 12:
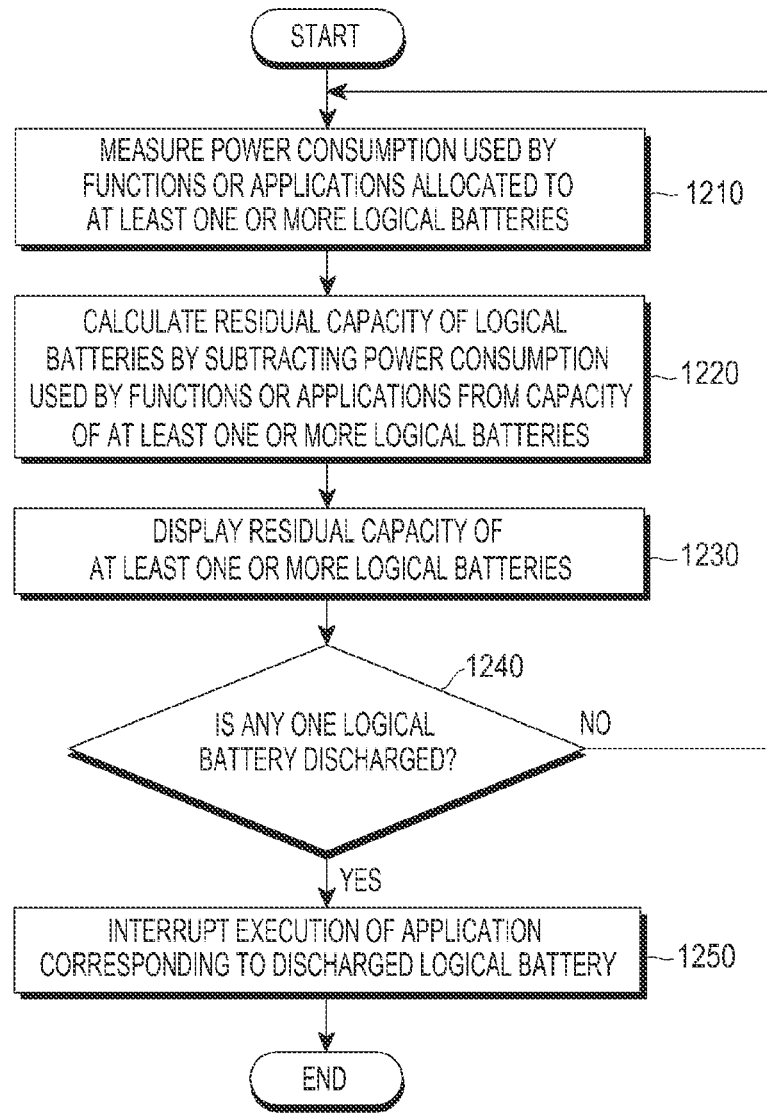
FIG. 12 is a flowchart illustrating operations of displaying a capacity of logical batteries according to an embodiment of the present disclosure.

FIG. 12 is a flowchart illustrating operations of displaying a capacity of logical batteries according to an embodiment of the present disclosure. Referring to FIG. 12, a mobile terminal 100 measures power consumption used by functions or applications allocated to at least one or more logical batteries, in step 1210.

In step 1220, the mobile terminal 100 calculates a residual capacity of each logical battery by subtracting the power consumption used by the corresponding function or application from a total capacity of each logical battery. For example, if a logical battery to which a telephone function is allocated has a capacity corresponding to 40% of an entire battery capacity, the mobile terminal 100 calculates a residual capacity by subtracting power consumption used by the telephone function from the logical battery capacity of 40%. In other words, assuming that an entire battery residual capacity is 2000 mA, a logical battery to which the telephone function is allocated has a capacity of 800 mA corresponding to 40% of the entire capacity 2000 mA, and a residual capacity of the logical battery is calculated by subtracting power consumption used by the telephone function from the capacity of 800 mA. At this time, the power consumption for each of the functions or applications may be calculated by using a mean value of the power consumption and a consumed current per second.

In step 1230, the mobile terminal 100 displays the residual capacity of the at least one or more logical batteries through the above-described calculation.

Referring now to FIG. 13, which illustrates an example of a screen on which residual capacities of logical batteries are displayed according to an embodiment of the present disclosure, the residual capacities of the logical batteries are displayed through logical battery indicators. The residual capacities of the logical batteries may be displayed on a home screen or a status bar 192.

Figure 13A:
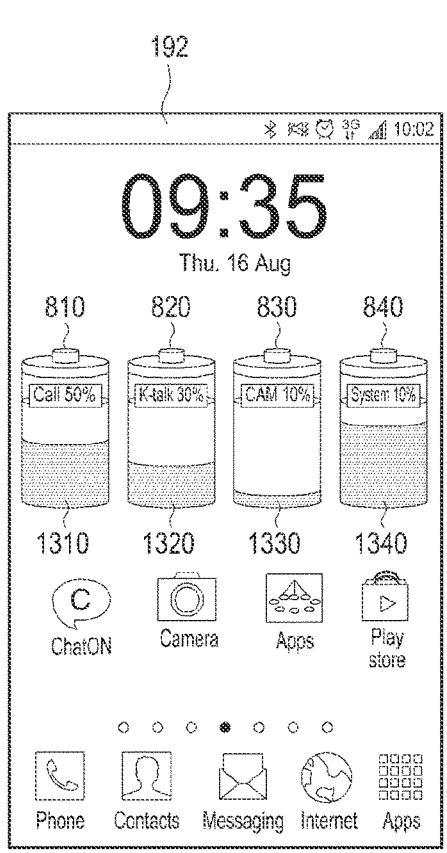
FIGS. 13A-13B illustrate an example of a screen on which residual capacities of logical batteries are displayed according to an embodiment of the present disclosure.

FIG. 13A illustrates the residual capacities of the logical batteries displayed on the home screen. In FIG. 13A, logical battery indicators 810 to 840 represent that an original battery is partitioned into four logical batteries having capacities of 50%, 30%, 10%, and 10%, respectively, and a call function (call), a K-talk application (K-talk), a camera function (CAM), and a system function (System) are allocated to the respective four logical batteries. At this time, the residual capacities of the logical batteries may be displayed through a residual amount on the logical battery indicators 810 to 840 as indicated by reference numerals 1310 to 1340.

Figure 13B:
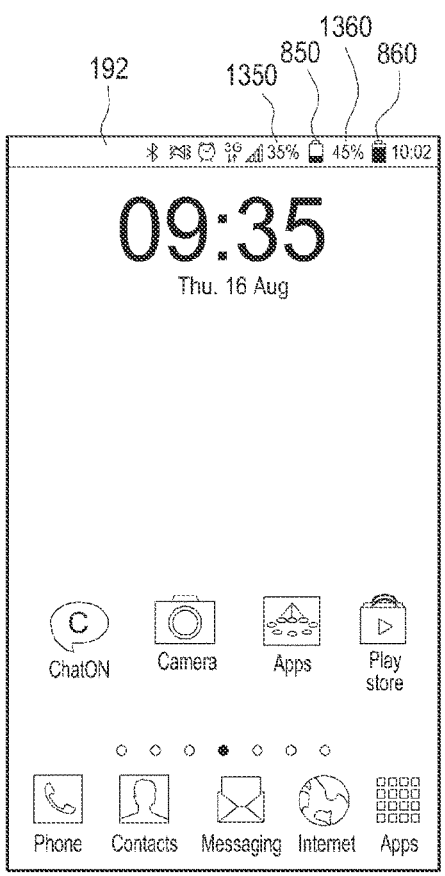

FIG. 13B illustrates the residual capacities of the logical batteries displayed on the status bar 192. FIG. 13B represents that two logical battery indicators 850 and 860 may be displayed on the status bar. At this time, the two logical battery indicators 850 and 860 may be displayed together with residual capacities (35% and 45%) 1350 and 1360, respectively. Through the residual capacity for each of the logical batteries, a user may identify how much of the logical battery capacity allocated to the corresponding function or application is left.

Referring to FIG. 12, the mobile terminal 100 displays the battery residual capacities as described above, and determines in step 1240 whether any one of the at least one or more logical batteries is discharged. If none are discharged, the mobile terminal returns to step 1210.

If any one of the logical batteries is discharged, the mobile terminal 100 interrupts the function or application corresponding to the discharged logical battery, in step 1250. For example, even though a user requests execution of the function or application corresponding to the discharged logical battery, the mobile terminal 100 does not execute the corresponding function or application.

When any one logical battery has been discharged, the mobile terminal 100 may allow a telephone function rather than an idle screen to be executed as a default in order to reduce power consumption of the battery. According to another embodiment, when any one logical battery has been discharged, the mobile terminal 100 may partition again the battery into logical batteries based on the entire residual capacity of the battery at the time of the discharge, and may also reallocate the residual capacity of the logical batteries. For example, in a case in which a logical battery for a telephone function is set to have a capacity corresponding to 40% of the entire battery capacity, if the capacity of 40% is completely consumed, the mobile terminal 100 may calculate again the logical battery capacity for the telephone function as 40% based on the entire battery residual capacity, and may reallocate the calculated capacity to the logical battery.

Meanwhile, according to an embodiment of the present disclosure, the mobile terminal 100 may adjust the at least one or more logical batteries when the logical batteries need to be adjusted.

Figure 14:
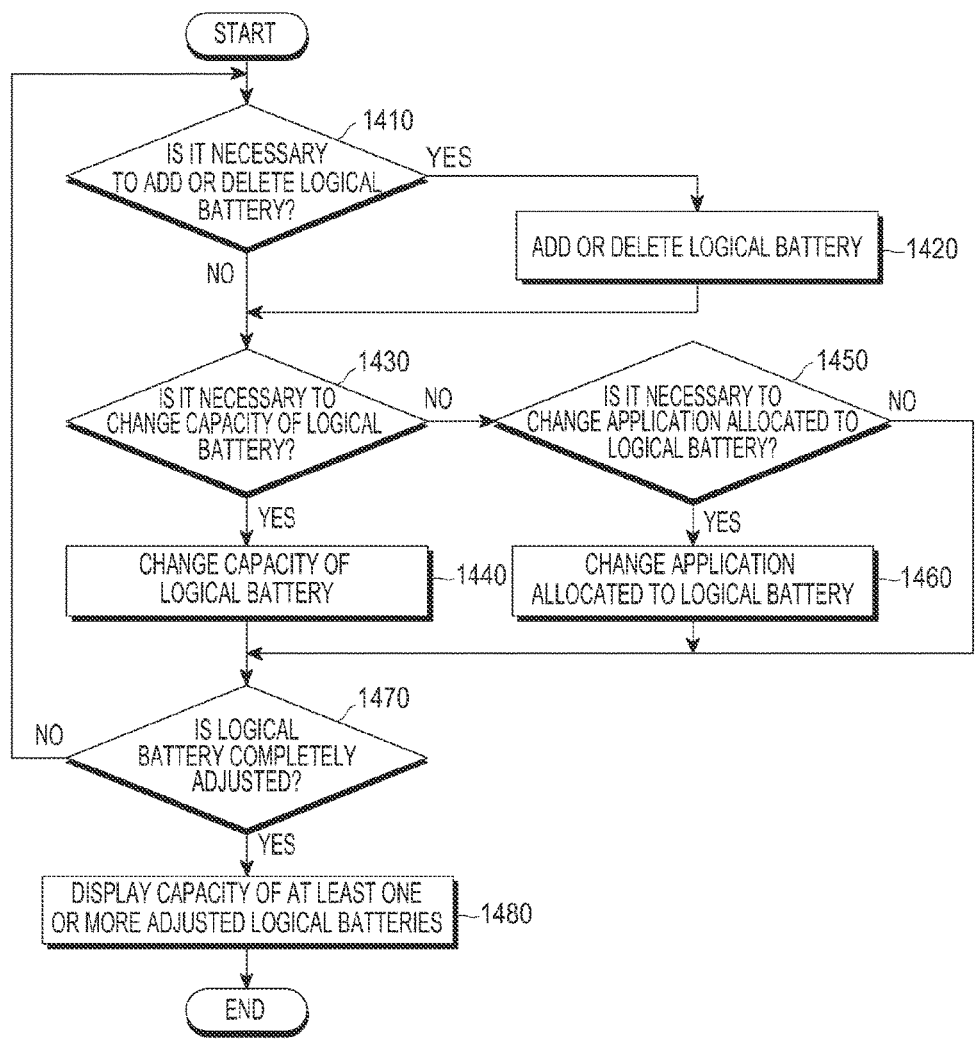
FIG. 14 is a flowchart illustrating operations of adjusting a logical battery according to an embodiment of the present disclosure.

FIG. 14 is a flowchart illustrating operations of adjusting a logical battery according to an embodiment of the present disclosure. Referring to FIG. 14, a mobile terminal 100 determines whether a logical battery needs to be added or deleted in step 1410. The mobile terminal 100 determines whether a user inputs a request for adding or deleting a logical battery or whether a logical battery needs to be added or deleted according to a use history of functions or applications. In step 1420, the mobile terminal 100 adds or deletes the logical battery according to the need of adding or deleting the logical battery.

In step 1430, the mobile terminal 100 determines whether it is necessary to change a capacity of a logical battery. The mobile terminal 100 may determine whether a user inputs a request for changing the capacity of the logical battery or whether it necessary to change the capacity of the logical battery according to the use history of functions or applications. In step 1440, the mobile terminal 100 changes the capacity of the logical battery according to the need of changing the capacity of the logical battery.

In step 1450, the mobile terminal 100 determines whether it is necessary to change an application allocated to a logical battery. The mobile terminal 100 may determine whether a user inputs a request for changing the application allocated to the logical battery or whether it necessary to change the application allocated to the logical battery according to the use history of the application. In step 1460, the mobile terminal 100 changes the application allocated to the logical battery according to the need for changing the application allocated to the logical battery. For example, if a user desires to additionally allocate a Social Network Service (SNS) function to an existing logical battery while a telephone function is allocated to the existing logical battery, the SNS function may be additionally allocated to the corresponding logical battery together with the telephone function.

Figures 15A, 15B:
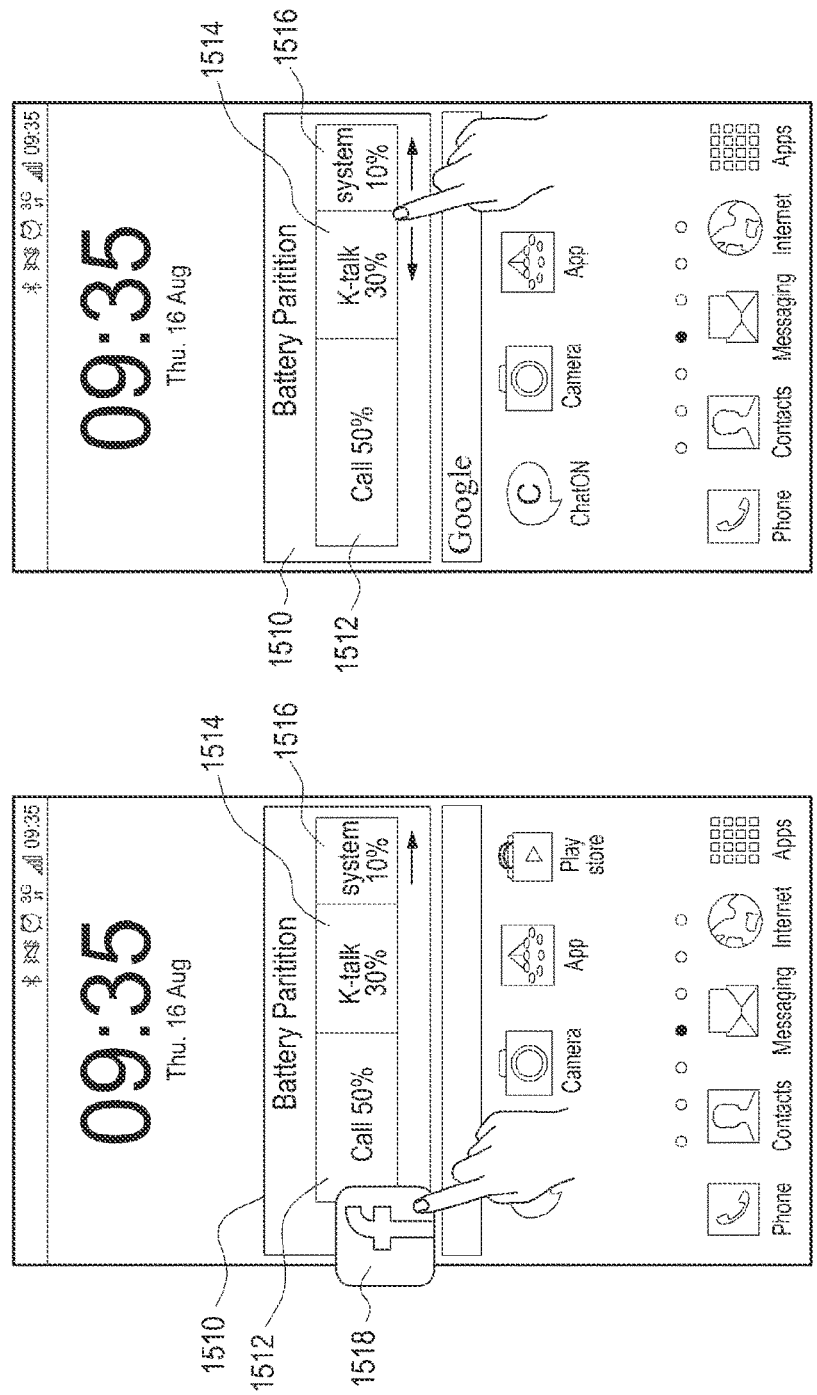
FIGS. 15A-15B illustrate an example of a logical battery adjustment screen according to an embodiment of the present disclosure.

Referring now to FIG. 15, which illustrates an example of a logical battery adjustment screen according to an embodiment of the present disclosure, and in particular to FIG. 15A, while a battery is partitioned into logical batteries 1510 including a logical battery "Call 50%" 1512, a logical battery "K-talk 30%" 1514, and a logical battery "System 10%" 1516, the mobile terminal 100 may add a logical battery to allocate another application 1518 to the logical batteries 1510. At this time, if a user touches and drags an icon of the another application 1518 and drops the icon onto the logical batteries 1510, a logical battery to which the another application 1518 is allocated may be added.

Referring to FIG. 15B, while a battery is partitioned into logical batteries 1510 including a logical battery "Call 50%" 1512, a logical battery "K-talk 30%" 1514, and a logical battery "System 10%" 1516, if a user slides a boundary between the logical batteries 1510, capacities of the logical batteries 1510 may be changed. For example, when there is a user input for sliding a boundary between the logical battery "K-talk 30%" 1514 and the logical battery "System 10%" 1516 toward the logical battery "K-talk 30%" 1514, a capacity of the logical battery "System 10%" 1516 may be increased and a capacity of the logical battery "K-talk 30%" 1514 may be decreased.

Referring back to FIG. 14, when it is determined in step 1470 that the logical battery is completely adjusted, the mobile terminal 100 may display the capacity of at least one or more adjusted logical batteries, in step 1480.

Meanwhile, according to various embodiments of the present disclosure, the mobile terminal 100 may set a category including at least one application to be allocated to the at least one or more logical batteries, or may set one application to be allocated to the at least one or more logical batteries.

Figure 16:
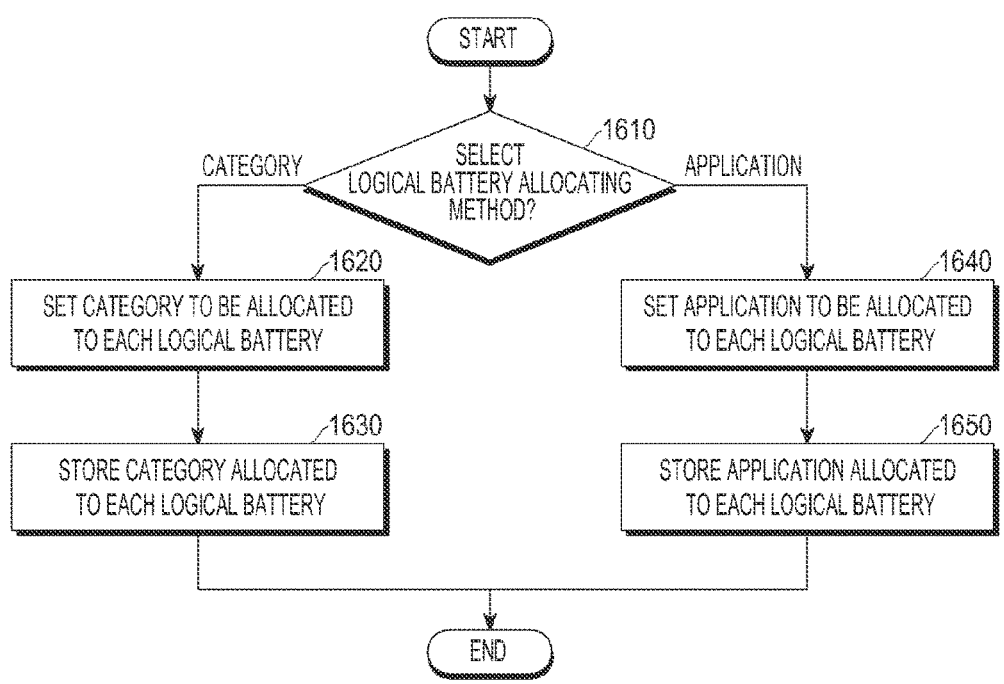
FIG. 16 is a flowchart illustrating operations of allocating at least one application to logical batteries according to an embodiment of the present disclosure.

FIG. 16 is a flowchart illustrating operations of allocating at least one application to logical batteries according to an embodiment of the present disclosure, and FIG. 17 illustrates screens for allocating a category and an application, respectively, to logical batteries according to an embodiment of the present disclosure.

Referring to FIGS. 16 and 17, a mobile terminal 100 selects whether a category or an application is allocated to logical batteries, in step 1610. At this time, a category may be set in advance to be allocated to the logical batteries, or an application may be set in advance to be allocated to the logical batteries, without the selection as to whether the category or the application is allocated to the logical batteries.

Figures 17A, 17B:
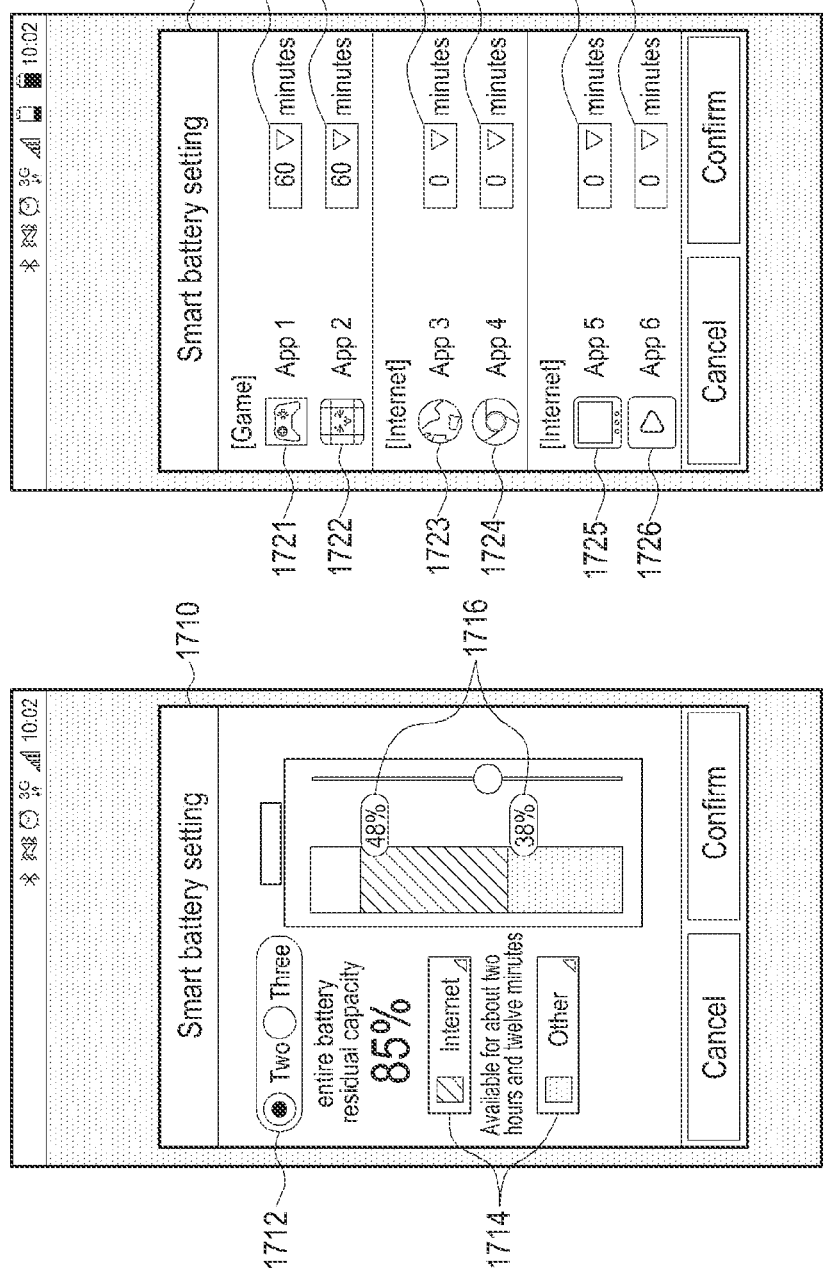
FIGS. 17A-17B illustrate screens for allocating a category and an application, respectively, to logical batteries according to an embodiment of the present disclosure.

When the method for allocating the category to the logical batteries is selected, the mobile terminal 100 sets a category that will be allocated to each of the logical batteries, in step 1620. For example, as illustrated in FIG. 17A, the mobile terminal 100 sets the number of categories 1712, types of categories 1714, and logical battery capacities for the respective categories 1716 on a logical battery setting screen 1710. Specifically, the mobile terminal 100 may set the number of categories 1712 to two, the two types of categories to an Internet category and another category, a logical battery capacity for the Internet category to 48%, and a logical battery capacity for the another category to 38%. At this time, the Internet category may include at least one or more applications related to the Internet, and the another category may include at least one or more other applications. When the category which will be allocated to each of the logical batteries is set, the mobile terminal 100 stores the category to be allocated to the logical category, in step 1630.

When the method for allocating the application to the logical batteries is selected, the mobile terminal 100 sets an application that will be allocated to each of the logical batteries, in step 1640. For example, as illustrated in FIG. 17B, the mobile terminal 100 may set applications that will be allocated to each logical battery, by selecting use times 1721-1 to 1726-1 for at least one or more applications 1721 to 1726 contained in each category on a logical battery setting screen 1720. Specifically, for example, when use time of 60 minutes (1721-1) is selected for App 1 (1721), the App 1 may be set to be allocated to a logical battery having power to be consumed by the App 1 for 60 minutes. When the application which will be allocated to each logical battery is set, the mobile terminal 100 stores the application to be allocated to the logical category, in step 1650.

According to the above-described embodiment of the present disclosure, a user may use each logical battery for one application, or may use each logical battery for a plurality of applications corresponding to the same category.

According to various embodiments of the present disclosure, when at least one or more applications are allocated to at least one or more logical batteries, the mobile terminal 100 may not display on a home screen or may deactivate icons corresponding to applications that are not allocated to the at least one or more logical batteries.

Figure 18:
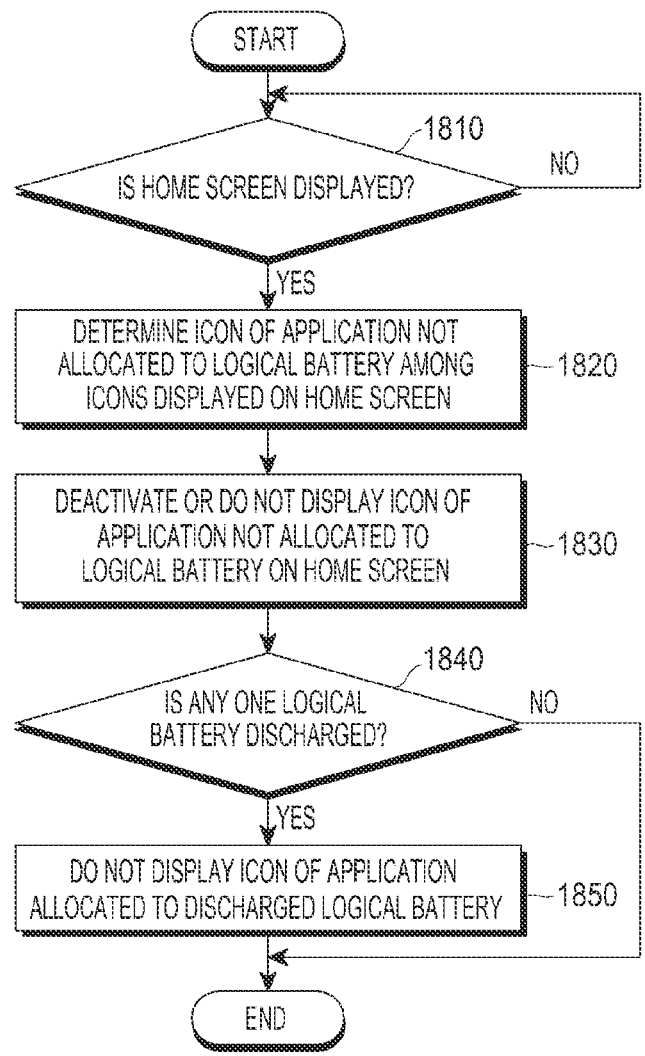
FIG. 18 is a flowchart illustrating operations of displaying application icons on a home screen according to an embodiment of the present disclosure.
Figure 19:
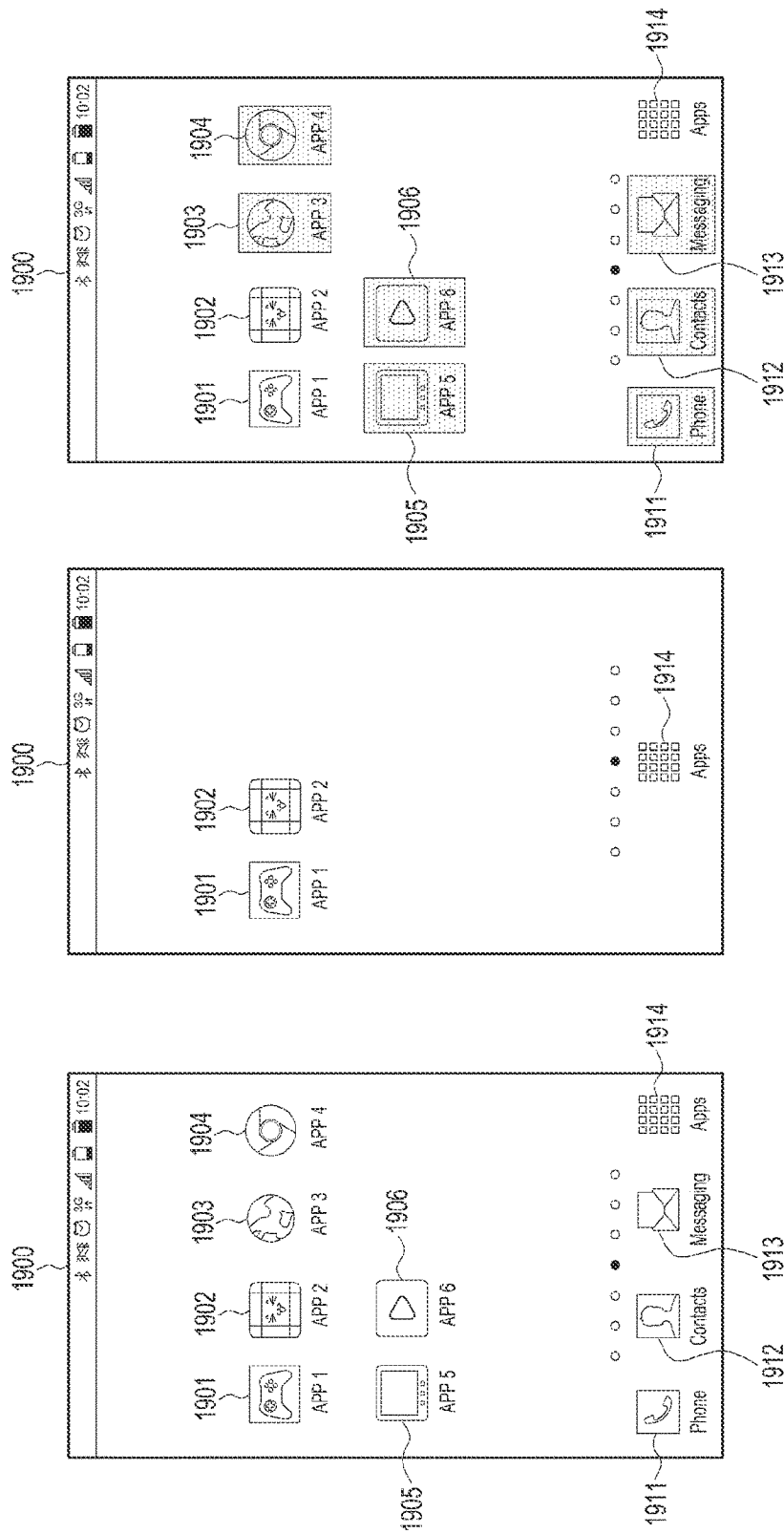
FIGS. 19A-19C illustrates examples of a home screen according to embodiments of the present disclosure.

FIG. 18 is a flowchart illustrating operations of displaying application icons on a home screen according to an embodiment of the present disclosure, and FIG. 19 illustrates examples of a home screen according to embodiments of the present disclosure.

Referring to FIGS. 18 and 19, a mobile terminal 100 determines whether a home screen is to be displayed, in step 1810. The home screen may be a main home screen. The main home screen is a first screen displayed on the touch screen 190 when the mobile terminal 100 is turned on. Further, when the mobile terminal 100 has several pages of different home screens, the main home screen may be a first home screen of the several pages of home screens. For example, as illustrated in FIG. 19A, the mobile terminal 10 displays, on the home screen, short-cut icons 1901, 1902, 1903, 1904, 1905, and 1906 for executing first to sixth applications App 1 to App 6, respectively, which are frequently used, and icons such as a telephone icon 1911, a contacts icon 1912, a message icon 1913, and main menu switching icon 1914.

When the home screen is displayed, the mobile terminal 100 determines which icons correspond to applications that are not allocated to logical batteries, among the icons displayed on the home screen, in step 1820. In step 1830, the mobile terminal 100 does not display or deactivates the icons of the applications that are not allocated to the logical batteries, among the icons displayed on the home screen.

For example, among the short-cut icons 1901 to 1906 for executing the first to sixth applications App 1 to App 6, the telephone icon 1911, the contacts icon 1912, the message icon 1913, and the main menu switching icon 1914, the short-cut icons 1903 to 1906, the telephone icon 1911, the contacts icon 1912, and the message icon 1913 may correspond to icons of applications that are not allocated to the logical batteries. In this case, the mobile terminal 100 does not display, on the home screen, the short-cut icons 1903 to 1906, the telephone icon 1911, the contacts icon 1912, and the message icon 1913 as illustrated in FIG. 19B, or deactivates the short-cut icons 1903 to 1906, the telephone icon 1911, the contacts icon 1912, and the message icon 1913 on the home screen (e.g., displays them in a locking state) as illustrated in FIG. 19C by the shaded areas over each icon.

Furthermore, in step 1840, the mobile terminal 100 determines whether any one of the logical batteries is discharged while the home screen is being displayed. When any one of the logical batteries is discharged while the home screen is being displayed, the mobile terminal 100 performs a control such that an icon of an application allocated to the discharged logical battery is not displayed or is deactivated, in step 1850. For example, whenever at least one or more logical batteries are discharged, the mobile terminal 100 does not display or deactivates icons of applications allocated to the discharged logical batteries. Accordingly, the icons of the corresponding applications may not be displayed or may be deactivated in an order in which the at least one or more logical batteries are discharged.

According to the above-described embodiment of the present invention, the mobile terminal 100 may restrict usage of the applications which are not allocated to the logical batteries, by deactivating or not displaying the icons of the applications which are not allocated to the logical batteries among the icons displayed on the home screen.

Meanwhile, according to various embodiments of the present disclosure, the mobile terminal 100 may display an alert message and may interrupt a corresponding function when any one or all of the at least one or more logical batteries are discharged.

Figure 20:
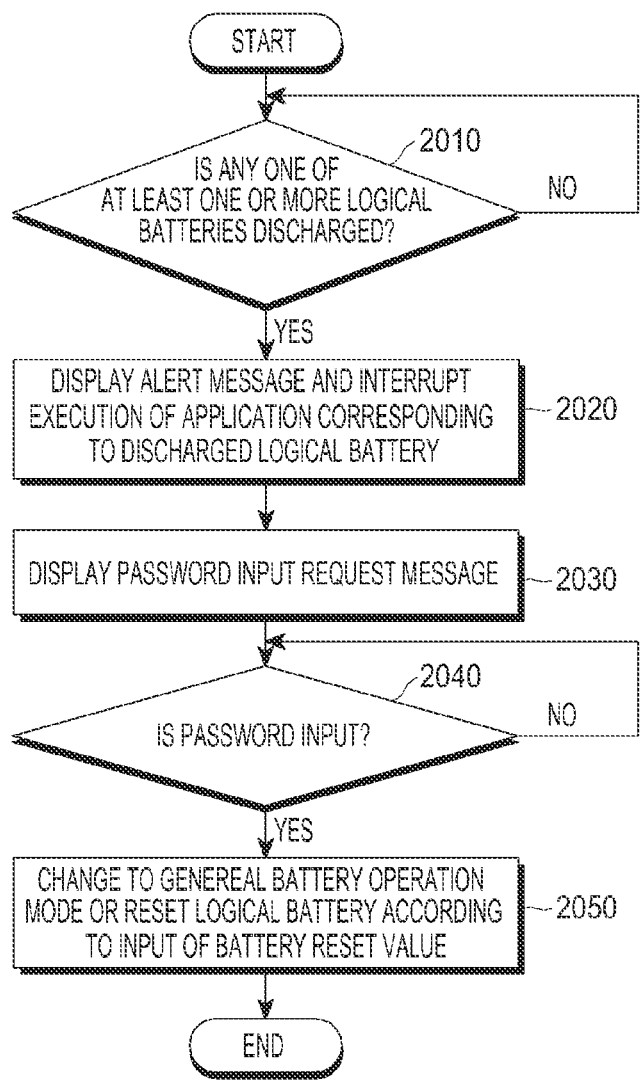
FIG. 20 is a flowchart illustrating operations when at least one or more logical batteries are discharged according to an embodiment of the present disclosure.

FIG. 20 is a flowchart illustrating operations when at least one or more logical batteries are discharged according to an embodiment of the present disclosure, and FIGS. 21 and 22 illustrate examples of a screen when at least one or more logical batteries are discharged according to an embodiment of the present disclosure.

Referring to FIG. 20, a mobile terminal 100 determines whether any one of at least one or more logical batteries is discharged in step 2010. When it is determined that any one logical battery has been discharged, the mobile terminal 100 displays an alert message and interrupts execution of an application corresponding to the discharged logical battery, in step 2020. For example, when any one of the at least one or more logical batteries has been discharged, the mobile terminal 100 displays the alert message informing the user that any one logical battery has been discharged, and interrupts the execution of the application corresponding to the discharged logical battery. Furthermore, when all of the logical batteries have been discharged, the mobile terminal 100 displays an alert message informing the user that all of the logical batteries have been discharged, and interrupts execution of all applications allocated to the at least one or more logical batteries.

In step 2030, the mobile terminal 100 displays a password input request message. For example, the mobile terminal 100 may display the password input request message together with the alert message or after displaying the alert message. In step 2040, the mobile terminal 100 determines whether a password is input in response to the password input request message. When a user inputs the password, the mobile terminal 100 changes from a logical battery operation mode to a general battery operation mode, or resets the logical batteries in step 2050.

Figures 21A, 21B:
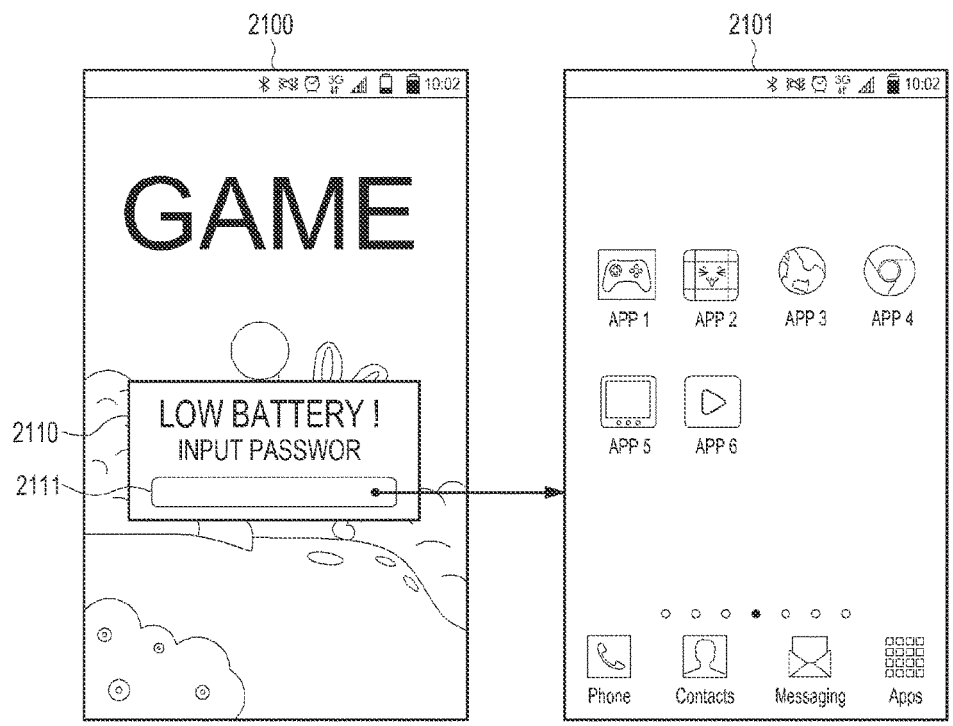
FIGS. 21A-21B and 22A-22C illustrate examples of a screen when at least one or more logical batteries are discharged according to an embodiment of the present disclosure.

For example, referring to FIG. 21, when a logical battery to which a game application is allocated is discharged during execution of the game application 2100, the mobile terminal 100 displays an alert message 2110 containing a password input request message 2111, as illustrated in FIG. 21A. When a password is input, the mobile terminal 100 changes from the logical battery operation mode to the general battery operation mode, and displays a normal screen according to the general battery operation mode, for example a home screen 2101, as illustrated in FIG. 21B. In the general battery operation mode, the mobile terminal may operate, recognizing the entire capacity of one or more physical batteries as an original battery.

Figures 22A, 22B, 22C:
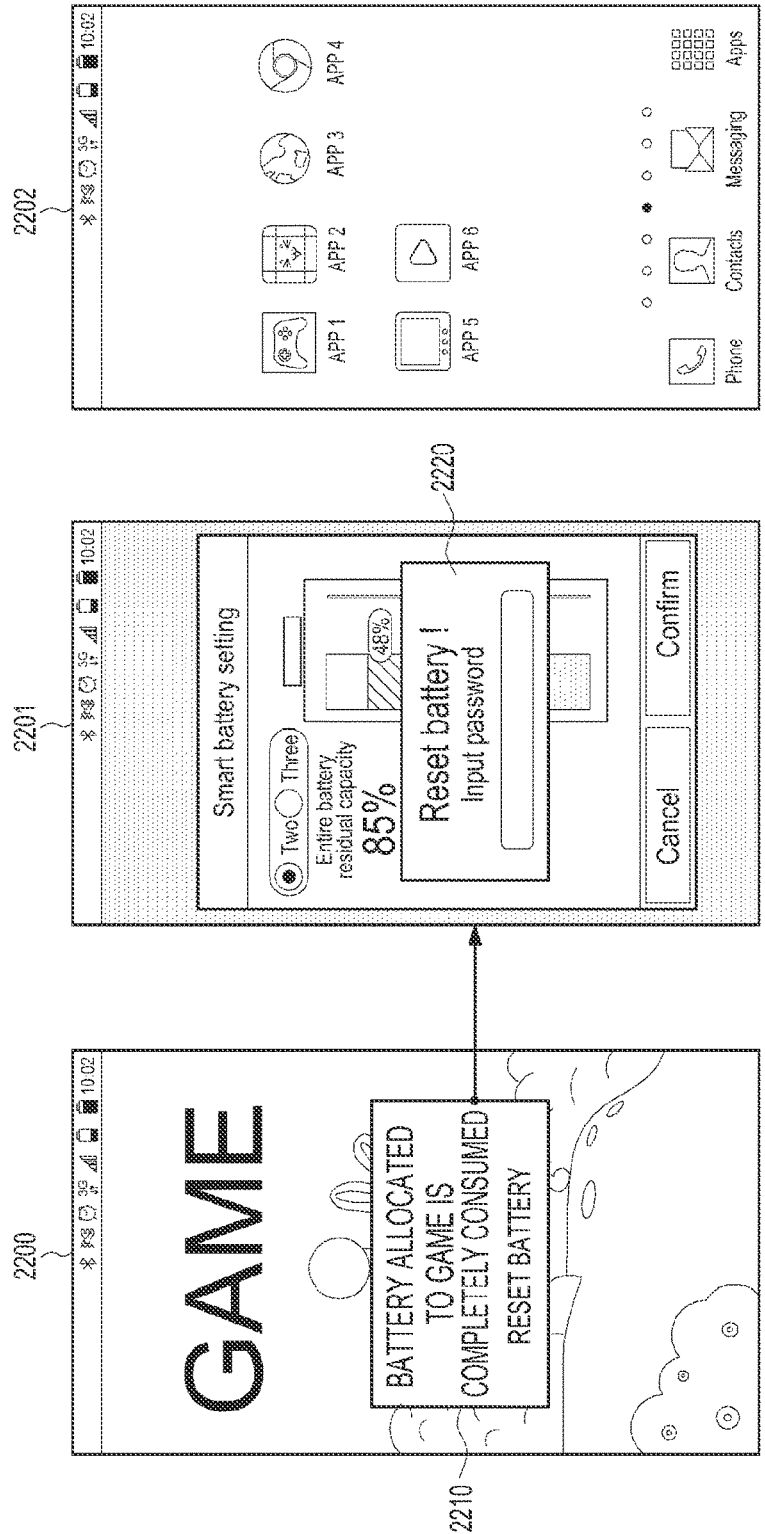

Furthermore, referring to FIG. 22, when a logical battery to which a game application is allocated is discharged during execution of the game application 2200, the mobile terminal 100 displays an alert message 2210 as illustrated in FIG. 22A. The mobile terminal 100 displays a logical battery setting screen 2201 and a password input request message 2220 for resetting the logical batteries as illustrated in FIG. 22B, after displaying the alert message 2210. When a password is input in response to the password input request message 2220 for resetting the logical batteries, the mobile terminal 100 resets the logical batteries according to a user input. When the logical batteries are completely reset, the mobile terminal 100 displays a normal screen according to the resetting of the logical batteries, for example a home screen 2202, as illustrated in FIG. 22C.

According to the above-described embodiment of the present disclosure, when a logical battery is discharged, the mobile terminal may interrupt the execution of the application corresponding to the discharged logical battery, thereby restricting the use of the application such that the application may be used only for a time period corresponding to the capacity of the logical battery. For example, in a case in which a game application is allocated to any one of the logical batteries, if the logical battery is completely consumed, the mobile terminal interrupts execution of the game application, thereby restricting the use of the game application such that the game application may be used only for a time period corresponding to the predetermined capacity of the logical battery.

Meanwhile, according to various embodiments of the present disclosure, the mobile terminal 100 may reset the logical battery through a logical battery resetting menu according to a user's request irrespective of a discharge of the logical battery.

Figures 23A, 23B:
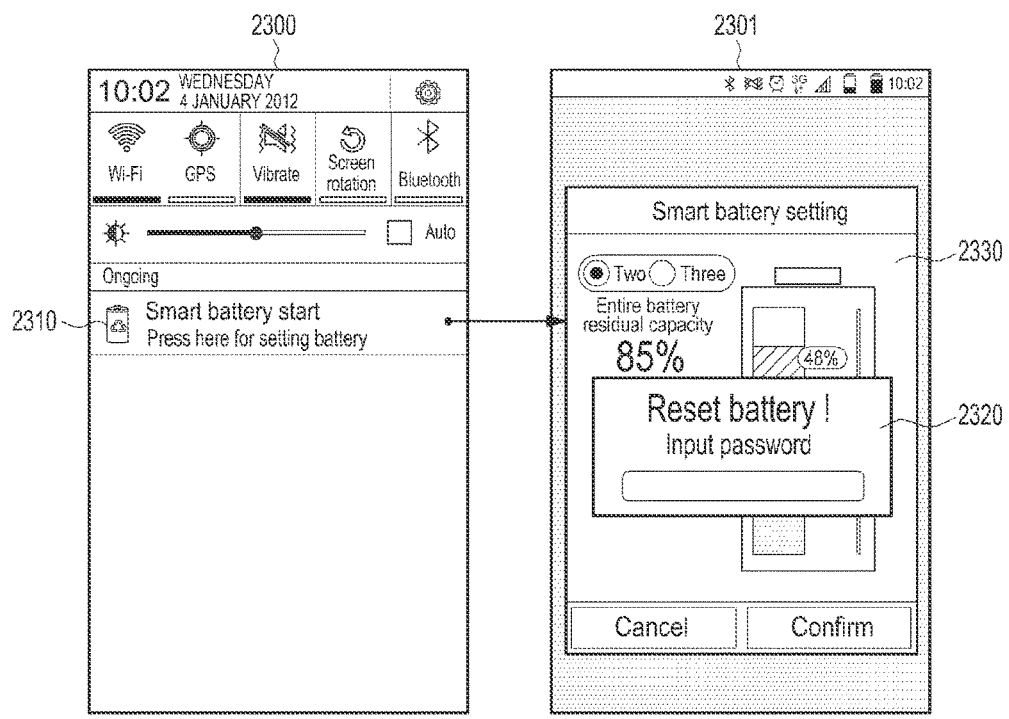
FIGS. 23A-23B illustrate a logical battery resetting screen according to an embodiment of the present disclosure.

FIG. 23 illustrates a logical battery resetting screen according to an embodiment of the present disclosure. Referring to FIG. 23, a mobile terminal 100 displays a logical battery setting menu 2310, for example, a smart battery start menu on a setting screen 2300 as illustrated in FIG. 23A. The setting menu may include other setting menus, for example, a Wi-Fi setting menu, a GPS setting menu, a vibration setting menu, and the like, in addition to the logical battery setting menu 2310. When a user selects the logical battery setting menu 2310, the mobile terminal 100 displays a logical battery setting screen 2301 and a password input request message 2320 for resetting logical batteries, as illustrated in FIG. 23B. When a password is input in response to the password input request message 2320 for resetting the logical batteries, the mobile terminal 100 resets the logical batteries according to a user input through logical battery setting items 2330.

The methods according to the embodiments of the present disclosure may be implemented in a form of program commands which may be executed through various computer means, and may be recorded in a computer readable medium. The computer readable medium may include a program command, a data file, a data structure, and the like independently or in combination thereof. The program command recorded in the computer readable medium may be one which is specifically designed and configured for the present disclosure, or may be well-known to and used by a person ordinarily skilled in the art of computer software.

It can be seen that the methods of providing battery information can be implemented in a form of hardware, software, or a combination of hardware and software in the mobile terminal according to the embodiments of the present disclosure. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure. Accordingly, the present disclosure includes a program for a code implementing the apparatus and method described in the appended claims of this specification and a machine (a computer or the like)-readable storage medium for storing the program. Further, the program may be electronically transferred by any communication signal through a wired or wireless connection, and the present disclosure appropriately includes equivalents of the program.

Furthermore, the mobile terminal according to the embodiments of the present disclosure may receive and store the program from a program providing device connected thereto in a wired or wireless manner. The program providing device may include a memory for storing programs including instructions allowing the user interface methods according to the various embodiments of the present disclosure to be performed, a communication unit for performing wired or wireless communication with the mobile terminal, and a controller that make a control such that the corresponding program is transmitted through the communication unit according to a request of the mobile terminal or automatically.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device comprising:
a display;
a memory for storing an application use history; and
a processor configured to:
partition an entire battery capacity into at least one or more logical batteries,
allocate the at least one or more logical batteries to at least one or more applications according to the application use history,
based on a first logical battery capacity allocated to a first application being discharged during displaying an execution screen of the first application, display, on an execution screen of the first application, a message indicating that the first logical battery capacity is discharged and a battery reallocation is requested,
display, on the display, a message requesting input of a password,
in response to receiving the password, determine whether the password is correct,
and
based on determining that the password is correct, display, on the display, a screen for the battery reallocation and reallocate a portion of the at least one or more logical batteries, except for the first logical battery allocated to the first application, to the first application based on an input received through the screen for the battery reallocation.

2. The electronic device of claim 1, wherein a residual capacity for each of the at least one or more logical batteries is provided according to power consumed by the at least one or more logical batteries allocated to the at least one or more applications.

3. The electronic device of claim 1, wherein the processor is further configured to:
display, on the display a residual capacity for the at least one or more logical batteries.

4. The electronic device of claim 1, wherein the application use history comprises one of an application use frequency and application use time, and
wherein the processor is further configured to determine a number of logical batteries to partition the entire battery capacity based on one of the application use frequency and the application use time, and allocate the at least one or more logical batteries to an application according to priorities of the at least one or more applications.

5. The electronic device of claim 1, wherein, when any one of the at least one or more logical batteries is discharged, the processor is further configured to interrupt execution of an application allocated to the discharged logical battery.

6. The electronic device of claim 1, wherein the processor is further configured to change the number of the at least one or more logical batteries, capacities of the at least one or more logical batteries, and allocate the at least one or more logical batteries to the applications according to a request for adjusting the at least one or more logical batteries.

7. The electronic device of claim 1, wherein the at least one or more logical batteries comprise at least one of a logical battery for emergency use and a logical battery for a system to which a user's access is restricted.

8. The electronic device of claim 1, wherein the processor is further configured to allocate each of the at least one or more logical batteries to a category containing at least one or more applications.

9. The electronic device of claim 1, wherein the processor is further configured to identify a displayed icon of an application that is not allocated to the logical batteries and to no longer display the icon of an application that is not allocated to the logical batteries.

10. The electronic device of claim 1, wherein the processor is further configured to perform a control such that an icon of an application allocated to the discharged logical battery is not displayed, when any one of the at least one or more logical batteries is discharged.

11. The electronic device of claim 1, wherein the processor is further configured to:
identify a setting associated with the battery reallocation stored in the memory;
in response to the setting being a first setting, display, on the display, the screen for the battery reallocation and when the password is input, reallocate a portion of the at least one or more logical batteries to the first application based on an input received through the screen for the battery reallocation; and
in response to the setting being a second setting, change to a general battery operation mode when the password is input.

12. A method of providing battery information by an electronic device, the method comprising:
storing an application use history;
allocating at least one or more logical batteries to at least one or more applications according to the application use history;
based on a first logical battery capacity allocated for a first application being discharged during displaying an execution screen of the first application, displaying, on an execution screen of the first application on a display, a message indicating that the first logical battery capacity is discharged and a battery reallocation is requested,
displaying, on the display, a message requesting input of a password;
receiving the password;
in response to receiving the password, determining whether the password is correct;
and
based on determining that the password is correct, displaying, on the display, a screen for the battery reallocation and reallocating a portion of the at least one or more logical batteries, except for the first logical battery allocated to the first application, to the first application based on an input received through the screen for the battery reallocation.

13. The method of claim 12, further comprising:
providing residual capacities for the at least one or more logical batteries according to power consumed by the at least one or more logical batteries allocated to the at least one or more applications.

14. The method of claim 12, further comprising:
displaying, on the display, a residual capacity for each of the at least one or more logical batteries.

15. The method of claim 12, wherein the application use history comprises one of an application use frequency and application use time, and
wherein allocating the at least one or more logical batteries comprises:
determining a number of logical batteries to partition the entire battery capacity based on one of the application use frequency and the application use time; and
allocating the at least one or more logical batteries to an application according to priorities of the at least one or more applications.

16. The method of claim 12, further comprising:
interrupting execution of an application allocated to a discharged logical battery when any one of the at least one or more logical batteries is discharged.

17. The method of claim 12, further comprising:
changing the number of at least one or more logical batteries, capacities of the at least one or more logical batteries, and allocating the at least one or more logical batteries the applications according to a request for adjusting the at least one or more logical batteries.

18. The method of claim 12, wherein the at least one or more logical batteries comprise at least one of a logical battery for emergency use and a logical battery for a system, to which a user's access is restricted.

19. The method of claim 12, wherein the at least one or more logical batteries is allocated to a category containing at least one or more application.

20. The method of claim 12, further comprising:
performing a control such that an icon of an application allocated to a discharged logical battery is not displayed, when any one of the at least one or more logical batteries is discharged.

21. The method of claim 12, further comprising:
identifying a setting associated with the battery reallocation stored in the memory;
in response to the setting being a first setting, displaying the screen for the battery reallocation and when the password is input, reallocating a portion of the at least one or more logical batteries to the first application based on an input received through the screen for the battery reallocation; and in response to the setting being a second setting, changing to a general battery operation mode when the password is input.

22. A non-transitory computer-readable recording storage medium for storing instructions executable by a processor of an electronic device to cause the electronic device to perform a method of providing battery information, the method comprising:

storing an application use history;

allocating at least one or more logical batteries to at least one or more applications according to the application use history;

providing residual capacities for the at least one or more logical batteries according to power consumed by the at least one or more logical batteries allocated to the at least one or more applications;

based on a first logical battery capacity allocated for a first application being discharged during displaying an execution screen of the first application, displaying, on an execution screen of the first application of a display, a message indicating that the first logical battery capacity is discharged and a battery reallocation is requested, displaying, on the display, a message requesting input of a password;

receiving the password;

in response to receiving the password, determining whether the password is correct;

and based on determining that the password is correct, displaying, on the display, a screen for the battery reallocation and reallocating a portion of the residual capacities, except for the first logical battery allocated to the first application, to the first application based on an input received through the screen for the battery reallocation.

23. A portable terminal for providing battery information to a user, the portable terminal comprising:

at least one battery representing an entire battery capacity;

a processor configured to partition the entire battery capacity into at least one or more logical batteries, and allocate the at least one or more logical batteries to at least one or more applications according to an application use history; and a display configured to, when the processor partitions the entire battery capacity into the at least one or more logical batteries, display a capacity of each of the one or more logical batteries to which an application has been allocated, wherein based on a first logical battery capacity allocated for a first application being discharged during displaying an execution screen of the first application, the processor controls the display to display, on an execution screen of the first application, a message indicating that the first logical battery capacity is discharged and a battery reallocation is requested, controls the display to display a message requesting input of a password, in response to receiving the password, determine whether the password is correct, and based on determining that the password is correct, controls the display to display a screen for the battery reallocation and reallocates a portion of the at least one or more logical batteries, except for the first logical battery allocated to the first application, to the first application based on an input received through the screen for the battery reallocation.

* * * * *